(12) United States Patent
Sawase

(10) Patent No.: US 10,259,246 B2
(45) Date of Patent: Apr. 16, 2019

(54) LIQUID DISCHARGE APPARATUS

(71) Applicant: Hiroshi Sawase, Kanagawa (JP)

(72) Inventor: Hiroshi Sawase, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/730,890

(22) Filed: Oct. 12, 2017

(65) Prior Publication Data

US 2018/0134033 A1    May 17, 2018

(30) Foreign Application Priority Data

Nov. 14, 2016 (JP) .................................. 2016-221220
Aug. 28, 2017 (JP) .................................. 2017-163186

(51) Int. Cl.
| | |
|---|---|
| *B41J 2/14* | (2006.01) |
| *B41J 2/18* | (2006.01) |
| *B41J 2/19* | (2006.01) |
| *B41J 29/38* | (2006.01) |
| *B41J 2/175* | (2006.01) |

(52) U.S. Cl.
CPC ............ *B41J 29/38* (2013.01); *B41J 2/14274* (2013.01); *B41J 2/175* (2013.01); *B41J 2/17596* (2013.01); *B41J 2/18* (2013.01); *B41J 2202/12* (2013.01); *B41J 2202/21* (2013.01)

(58) Field of Classification Search
CPC ... B41J 2/19; B41J 2/18; B41J 2/17596; B41J 2202/07; B41J 2002/14403; B41J 2202/12
See application file for complete search history.

(56) References Cited

U.S. PATENT DOCUMENTS 8,366,224 B2 * 2/2013 Yokota ................. B41J 2/14233
347/7

FOREIGN PATENT DOCUMENTS

| JP | 2006-068904 | 3/2006 |
| JP | 2010-083021 | 4/2010 |
| JP | 2014-094505 | 5/2014 |

* cited by examiner

*Primary Examiner* — Geoffrey S Mruk
(74) *Attorney, Agent, or Firm* — Oblon, McClelland, Maier & Neustadt, L.L.P.

(57) ABSTRACT

A liquid discharge apparatus includes a circulation channel in which liquid circulates, a liquid discharge head disposed on the circulation channel to discharge the liquid, a bypass channel to connect an upstream portion and a downstream portion of the liquid discharge head, a switch to switch the circulation channel between a first route in which the bypass channel is a part of the circulation channel and a second route in which the bypass channel is not a part of the circulation channel, a pressure generator to generate pressure to circulate the liquid in the circulation channel, a degassing device to degas the liquid in the circulation channel, and control circuitry to perform a degassing operation to degas the liquid by circulating the liquid in the circulation channel.

10 Claims, 19 Drawing Sheets

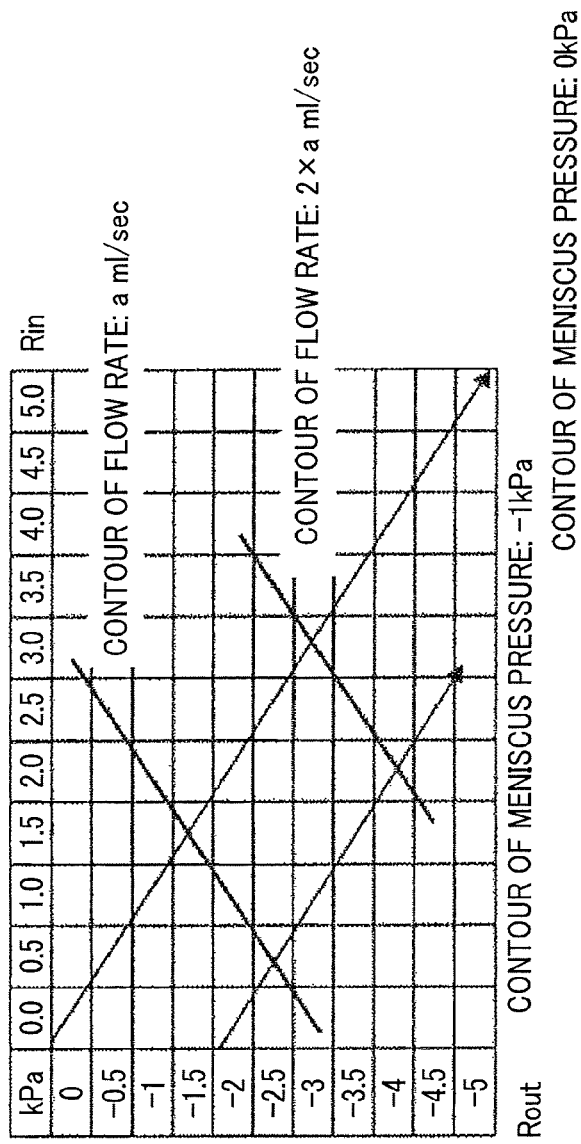

LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2016-221220, filed on Nov. 14, 2016 in the Japan Patent Office and Japanese Patent Application No. 2017-163186, filed on Aug. 28, 2017 in the Japan Patent Office, the entire disclosures of which are hereby incorporated by reference herein.

BACKGROUND

Technical Field

Aspects of this disclosure relate to a liquid discharge apparatus.

Related Art

In a liquid discharge apparatus that uses a flow-through type liquid discharge head (hereinafter, simply referred to as "head"), liquid in the head is circulated to remove the gas in the liquid (a process called "degassing"). It takes time for degassing the liquid in the head because the channels in the head are small, so that a flow rate of the circulated liquid in the head decreases when the degassing operation is performed by circulating the liquid through an interior of the head.

Thus, there is a liquid discharge head that has a bypass route (channel) that bypasses the liquid discharge head and circulates the liquid.

SUMMARY

In an aspect of this disclosure, a novel liquid discharge apparatus includes a circulation channel in which liquid circulates, a liquid discharge head disposed on the circulation channel to discharge the liquid, and a bypass channel to connect an upstream portion and a downstream portion of the liquid discharge head. A switch switches the circulation channel between a first route in which the bypass channel is a part of the circulation channel and a second route in which the bypass channel is not a part of the circulation channel. A pressure generator generates pressure to circulate the liquid in the circulation channel. A degassing device degasses the liquid in the circulation channel. Control circuitry degasses the liquid by circulating the liquid in the circulation channel. The control circuitry is configured to perform a first degassing operation and a second degassing operation performed after the first degassing operation. The first degassing operation circulates the liquid in the first route and the second degassing operation circulates the liquid in the second route. The second degassing operation is executed at a pressure lower than the pressure in the first degassing operation.

In another aspect of this disclosure, a liquid discharge apparatus includes a circulation channel in which liquid circulates, a liquid discharge head disposed on the circulation channel to discharge the liquid, a bypass channel to connect an upstream portion and a downstream portion of the liquid discharge head, a switch to switch the circulation channel between a first route, in which the bypass channel is a part of the circulation channel and the liquid discharge head is not a part of the circulation channel, and a second route, in which the liquid discharge head is a part of the circulation channel and the bypass channel is not a part of the circulation channel, a pressure generator to generate pressure to circulate the liquid in the circulation channel, a degassing device to degas the liquid in the circulation channel, and control circuitry to perform a degassing operation to degas the liquid by circulating the liquid in the circulation channel. The control circuitry is configured to perform a first degassing operation and a second degassing operation performed after the first degassing operation, the first degassing operation circulating the liquid in the first route and the second degassing operation circulating the liquid in the second route, and start circulating the liquid in the second degassing operation with the pressure lower than the pressure in the first degassing operation.

In still another aspect of this disclosure, a method for degassing a liquid discharge apparatus that discharges liquid from a liquid discharge head, the method includes circulating the liquid in a circulation channel on which the liquid discharge head is disposed, connecting an upstream portion and a downstream portion of the liquid discharge head with a bypass channel, degassing the liquid in the circulation channel while circulating the liquid by the circulating, switching circulation between a first route, in which the bypass channel is a part of the circulation channel, and a second route, in which the bypass channel is not a part of the circulation channel, performing a first degassing operation to circulate the liquid in the first route, performing a second degassing operation after the first degassing operation, the second degassing operation circulating the liquid in the second route, and starting circulating the liquid in the second degassing operation with the pressure lower than the pressure in the first degassing operation.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 10 is a graph that illustrates the pressure in nozzle meniscus and contour line of flow rate when Rr=1;

Figure 1:
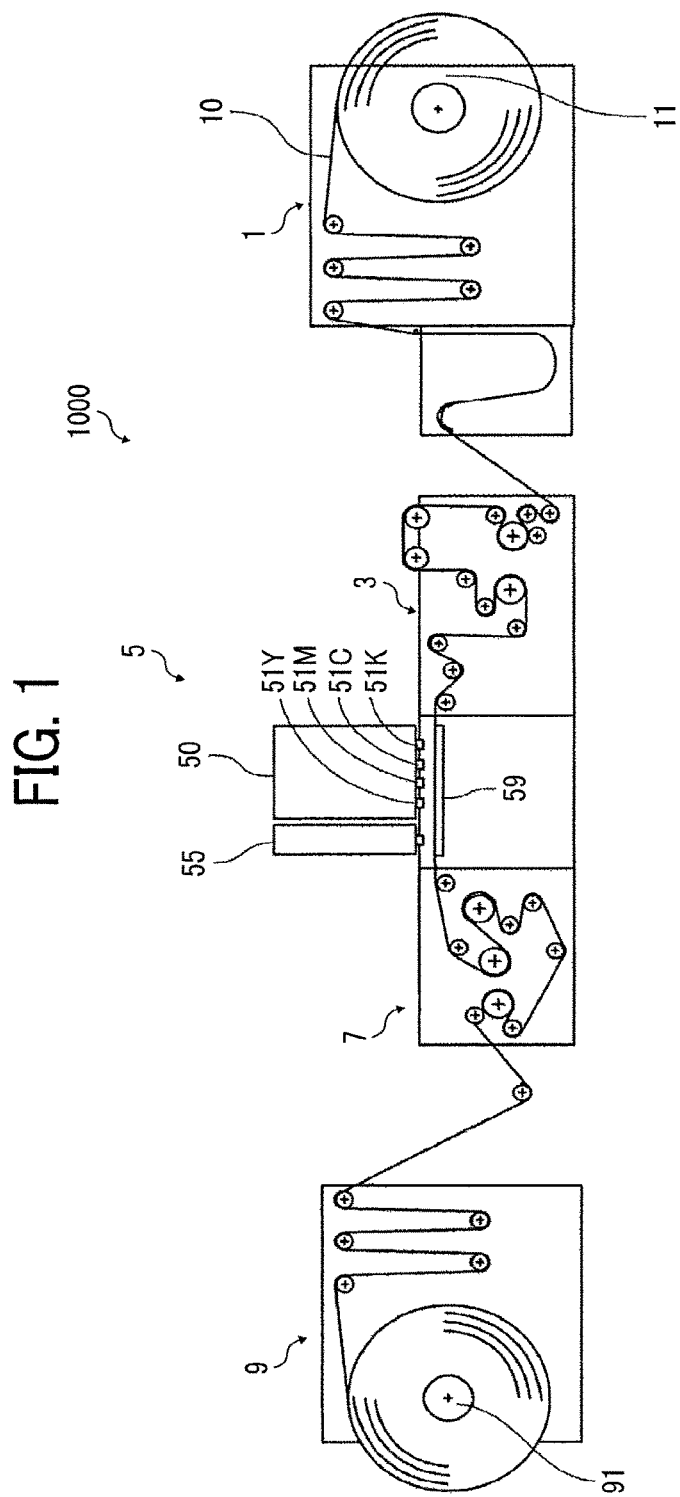
FIG. 1 is a schematic cross-sectional view of a liquid discharge apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable. As used herein, the singular forms "a", "an", and "the" are intended to include the plural forms as well, unless the context clearly indicates otherwise.

Referring now to the drawings, wherein like reference numerals designate identical or corresponding parts throughout the several views, embodiments of the present disclosure are described below.

Figure 2:
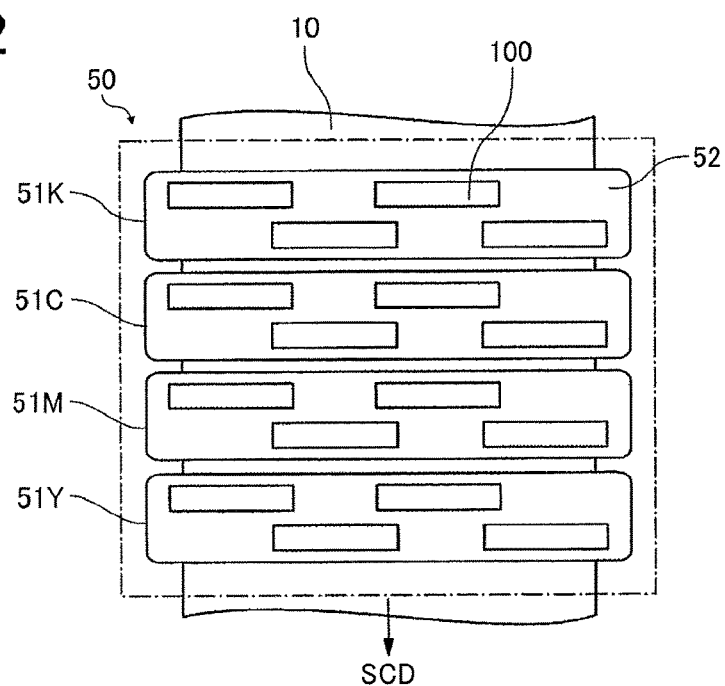
FIG. 2 is a plan view of a head unit of the liquid discharge apparatus of FIG. 1.

A liquid discharge apparatus according to a first embodiment of the present disclosure is described in detail below with reference to FIGS. 1 and 2. FIG. 1 is a schematic front view of the liquid discharge apparatus 1000. FIG. 2 is a plan view of a head unit of the liquid discharge apparatus 1000 of FIG. 1.

The liquid discharge apparatus 1000 according to the present embodiment includes a feeder 1 to feed a continuous medium 10, a guide conveyor 3 to guide and convey the continuous medium 10, fed from the feeder 1, to a printing unit 5 that discharges liquid onto the continuous medium 10 to form an image on the continuous medium 10, a drier unit 7 to dry the continuous medium 10, and an ejector 9 to eject the continuous medium 10.

The continuous medium 10 is fed from a take-up roller 11 of the feeder 1, guided and conveyed with rollers of the feeder 1, the guide conveyor 3, the drier unit 7, and the ejector 9, and wound around a winding roller 91 of the ejector 9.

In the printing unit 5, the continuous medium 10 is conveyed opposite a first head unit 50 and a second head unit 55 on a conveyance guide 59. The first head unit 50 discharges liquid to form an image on the continuous medium 10. Post-treatment is performed on the continuous medium 10 with treatment liquid discharged from the second head unit 55.

Here, the first head unit 50 includes, for example, four-color full-line head arrays 51K, 51C, 51M, and 51Y (hereinafter, collectively referred to as "head arrays 51" unless colors are distinguished) from an upstream side in a feed direction of the continuous medium 10 (hereinafter, "medium feed direction") indicated by arrow MFD in FIG. 1.

The head arrays 51K, 51C, 51M, and 51Y are liquid dischargers to discharge liquid of black (K), cyan (C), magenta (M), and yellow (Y) ink onto the continuous medium 10. Note that the number and types of colors are not limited to the above-described four colors of K, C, M, and Y and may be any other suitable number and type.

In each head array 51, for example, as illustrated in FIG. 2, a plurality of liquid discharge heads (also referred to as simply "heads") 100 are arranged in a staggered manner on a base 52 to form the head array 51. Note that the configuration of the head array 51 is not limited to such a configuration.

A liquid discharge head according to an embodiment of the present disclosure is described with reference to FIGS. 3 and 4.

Figure 3:
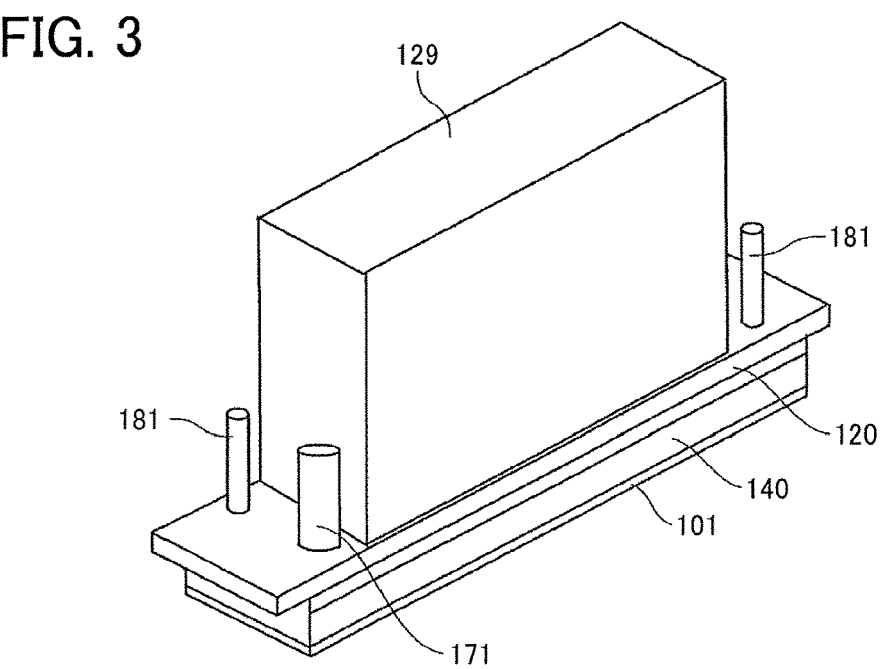
FIG. 3 is an outer perspective view of a liquid discharge head according to the present embodiment.

FIG. 3 is an outer perspective view of the head 100.

Figure 4:
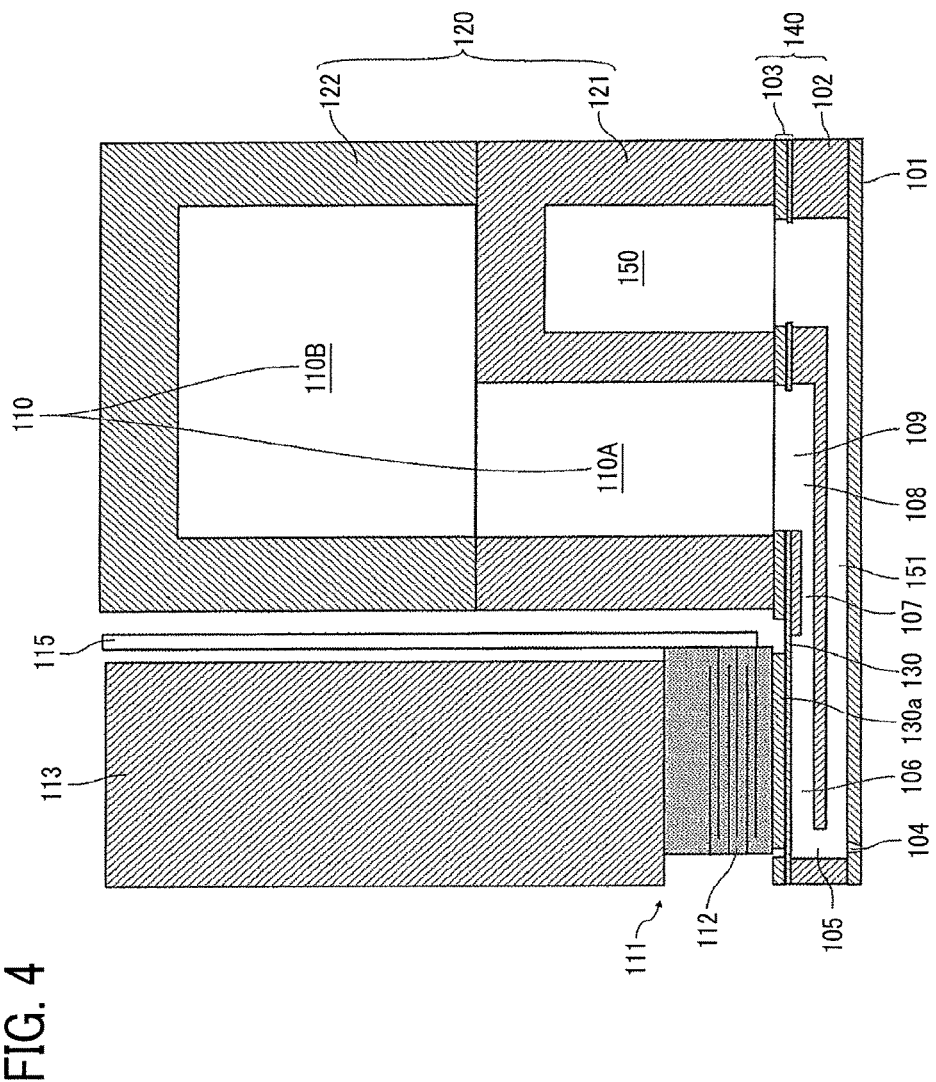
FIG. 4 is a cross-sectional view of the liquid discharge head in a direction perpendicular to a nozzle array direction in which nozzles are arrayed in a row direction (a longitudinal direction of an individual-liquid-chamber)

FIG. 4 is a cross-sectional view of the head 100 in a direction perpendicular to a nozzle array direction in which nozzles 104 are arrayed in rows (a longitudinal direction of an individual-liquid-chamber 106).

The head 100 includes a nozzle plate 101, a channel substrate 102, and a diaphragm member 103 as wall members that are laminated one on another and bonded to each other. The head 100 includes piezoelectric actuators 111 to displace a vibration portion 130 of the diaphragm member 103, a common-liquid-chamber substrate 120 that also serves as a frame member of the head 100, and a cover 129 (see FIG. 3). The channel substrate 102 and the diaphragm member 103 together constitute a channel member 140.

The nozzle plate 101 includes multiple nozzles 104 to discharge liquid. The channel substrate 102 includes through-holes and grooves that form individual-liquid-chambers 106, supply-side fluid restrictors 107, and liquid introduction portions 108. The individual-liquid-chambers 106 communicate with the nozzles 104 via a nozzle communication channel 105. The supply-side fluid restrictors 107 communicate with the individual-liquid-chambers 106.

The liquid introduction portions 108 communicate with the supply-side fluid restrictors 107. The nozzle communication channel 105 communicates with each of the nozzle 104 and the individual-liquid-chamber 106. The liquid introduction portions 108 communicate with the supply-side common-liquid-chamber 110 via the opening 109 of the diaphragm member 103.

The diaphragm member 103 includes the deformable vibration portions 130 constituting wall faces of the individual-liquid-chambers 106 of the channel substrate 102. In the present embodiment, the diaphragm member 103 has a two-layer structure including a first layer including thin portions facing the channel substrate 102 and a second layer including thick portions. The first layer includes the deformable vibration portions 130 at positions corresponding to the individual-liquid-chambers 106. Note that the diaphragm member 103 is not limited to the two-layer structure and the number of layers may be any other suitable number.

On the opposite side of the individual liquid chamber 106 of the diaphragm member 103, there is arranged the piezoelectric actuator 111 including an electromechanical transducer element as a driver (e.g., actuator, pressure generator) to deform the vibration portion 130 of the diaphragm member 103.

The piezoelectric actuator 111 includes piezoelectric elements 112 bonded on a base 113. The piezoelectric elements 112 are groove-processed by half cut dicing so that each piezoelectric element 112 includes a desired number of pillar-shaped piezoelectric elements 112 that are arranged at certain intervals to have a comb shape.

The piezoelectric element 112 is joined to a convex portion 130a, which is a thick portion having an island-like form formed on the vibration portion 130 of the diaphragm member 103. In addition, a flexible printed circuit (FPC) 115 is connected with the piezoelectric elements 112.

The common-liquid-chamber substrate 120 includes a supply-side common-liquid-chamber 110 and a drainage-side common-liquid-chamber 150. The supply-side common-liquid-chamber 110 is communicated with supply ports 171. The drainage-side common-liquid-chamber 150 is communicated with discharge ports 181 (See FIG. 3).

Note that, in the present embodiment, the common-liquid-chamber substrate 120 includes a first common-liquid-chamber substrate 121 and a second common-liquid-chamber substrate 122. The first common-liquid-chamber substrate 121 is bonded to the diaphragm member 103 of the channel member 140. The second common-liquid-chamber substrate 122 is laminated on and bonded to the first common-liquid-chamber substrate 121.

The first common-liquid-chamber substrate 121 includes a downstream common-liquid-chamber 110A and the drainage-side common-liquid-chamber 150. The downstream common-liquid-chamber 110A is part of the supply-side common-liquid-chamber 110 communicated with the liquid introduction portion 108. The drainage-side common-liquid-chamber 150 communicates with a drainage channel 151. The second common-liquid-chamber substrate 122 includes an upstream common-liquid-chamber 110B that is a remaining portion of the supply-side common-liquid-chamber 110.

The channel substrate 102 includes the drainage channels 151 formed along a surface direction of the channel substrate 102 and communicated with the individual-liquid-chambers 106 via the nozzle communication channel 105. The drainage channels 151 communicate with the drainage-side common-liquid-chamber 150.

In the head 100 thus configured, for example, when a voltage lower than a reference potential (intermediate potential) is applied to the piezoelectric element 112, the piezoelectric element 112 contracts. Accordingly, the vibration portion 130 of the diaphragm member 103 is pulled to increase the volume of the individual-liquid-chamber 106, thus causing liquid to flow into the individual-liquid-chamber 106.

When the voltage applied to the piezoelectric element 112 is raised, the piezoelectric element 112 extends in a direction of lamination. Accordingly, the vibration portion 130 of the diaphragm member 103 deforms in a direction toward the nozzle 104 and the volume of the individual-liquid-chamber 106 contracts. Thus, liquid in the individual-liquid-chamber 106 is pressurized and discharged from the nozzle 104.

Liquid not discharged from the nozzles 104 passes the nozzles 104 and is drained from the drainage channels 151 to the drainage-side common-liquid-chamber 150 and supplied from the drainage-side common-liquid-chamber 150 to the supply-side common-liquid-chamber 110 again through an external circulation route.

Note that the driving method of the head 100 is not limited to the above-described example (pull-push discharge). For example, pull discharge or push discharge may be performed in response to the way the drive waveform is supplied.

Figure 5:
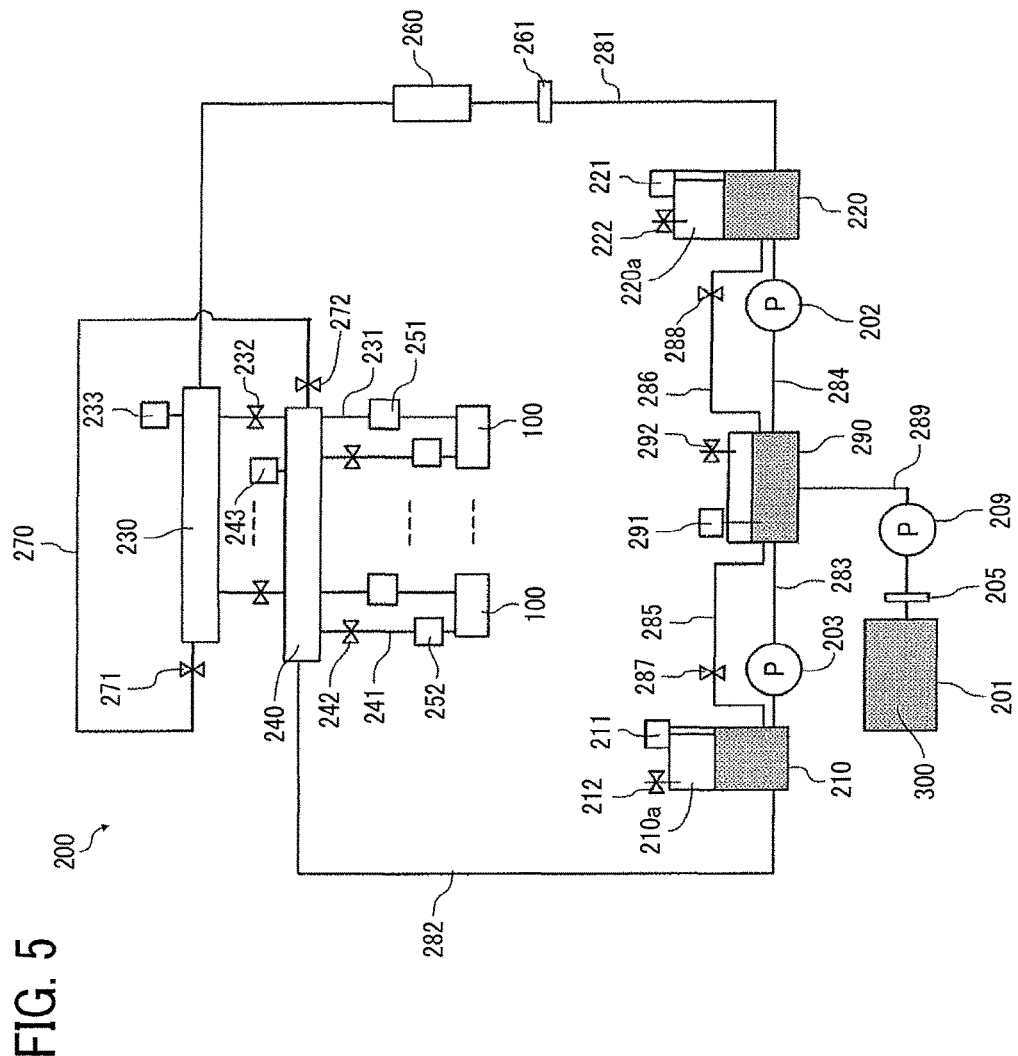
FIG. 5 is a schematic view of a liquid circulation system according to a first embodiment of the present disclosure.

Next, a part related to a liquid circulation system of a liquid supply apparatus 200 in the first embodiment of the present invention is described in detail below with reference to FIG. 5. A part or all of the liquid supply apparatus 200 serves as the liquid circulation system to circulate the liquid in the printing unit 5. FIG. 5 is a block diagram of the liquid circulation system (liquid supply apparatus 200).

A liquid supply apparatus 200 includes a main tank 201, a first sub tank 220, a second sub tank 210, a third sub tank 290, a first supply pump 202, a second supply pump 203, and a third supply pump 209. The main tank 201 stores liquid 300 to be discharged by the heads 100. The main tanks 201 acts as a liquid storing device. The main tank 201 may be a liquid cartridge detachable to the liquid supply apparatus 200.

The liquid supply apparatus 200 further includes a first manifold 230, a second manifold 240, a pressure head tank 251, a decompression head tank 252, and a degassing device 260. A plurality of heads 100 communicate with the first manifold 230 and the second manifold 240. The pressure head tank 251 and the decompression head tank 252 are provided for each of the heads 100. The degassing device 260 removes dissolved gas in the liquid. The second manifold 240 is disposed downstream of the first manifold 230 in a liquid flow (circulating) direction.

The third sub tank 290 is disposed between the first sub tank 220 and the second sub tank 210. The third supply pump 209 supplies the liquid to the third sub tank 290 from the main tank 201 via a liquid channel 289 that includes a filter 205.

The third sub tank 290 includes a liquid detector 291 to detect liquid surface of the liquid and a solenoid valve 292 that constitutes an air release mechanism to release inside the third sub tank 290 to the outside air.

The third sub tank 290 and the second sub tank 210 are connected by a liquid channel 283. The second supply pump 203 is provided on the liquid channel 283. Further, the third sub tank 290 and the second sub tank 210 are connected by a reverse liquid channel 285. A solenoid valve 287 is provided on the reverse liquid channel 285.

The second sub tank 210 includes a gas chamber 210a. Thus, liquid and gas coexist in the second sub tank 210. The second sub tank 210 includes a liquid detector 211 to detect liquid surface of the liquid 300 and a solenoid valve 212 that constitutes an air release mechanism to release inside the second sub tank 210 to the outside air.

The third sub tank 290 and the first sub tank 220 are connected by a liquid channel 284. The first supply pump 202 is provided on the liquid channel 284. Further, the third sub tank 290 and the first sub tank 220 are connected by a reverse liquid channel 286. A solenoid valve 288 is provided on the reverse liquid channel 286.

The first sub tank 220 includes a gas chamber 220a. Thus, liquid and gas coexist in the first sub tank 220. The first sub tank 220 includes a liquid detector 221 to detect liquid surface of the liquid 300 and a solenoid valve 222 that constitutes an air release mechanism to release inside the first sub tank 220 to the outside air.

The first sub tank 220 is connected to the first manifold 230 via the liquid channel 281 that includes a degassing device 260 and a filter 261.

The first manifold 230 is connected to a supply port 171 (See FIG. 3) of the head 100 via the supply channel 231. The supply channel 231 is connected to a supply port 171 (See FIG. 3) of the head 100 via the pressure head tank 251. A solenoid valve 232 is provided on an upstream side of the pressure head tank 251 on the supply channel 231 to open and close the supply channel 231. A pressure sensor 233 is provided on the first manifold 230.

The second sub tank 210 is connected to the second manifold 240 via the liquid channel 282.

The second manifold 240 is connected to each of the discharge ports 181 (See FIG. 3) of the heads 100 via discharge channels 241. The discharge channels 241 are connected to the discharge ports 181 (See FIG. 3) of the heads 100 via the decompression head tanks 252, respectively. Solenoid valves 242 are provided on a downstream side of decompression head tanks 252 on the discharge channels 241, respectively, to open and close the corresponding discharge channels 241. A pressure sensor 243 is provided on the second manifold 240.

Further, a bypass channel 270 is provided to connect the first manifold 230 and the second manifold 240. The first manifold 230 is disposed upstream side of the head 100 and the second manifold 240 is disposed downstream side of the head 100 in a liquid flow direction. A solenoid valve 271 is provided on the first manifold 230 side of the bypass channel 270, and a solenoid valve 272 is provided on the second manifold 240 side of the bypass channel 270.

Here, a circulation channel is configured by a route started from the third sub tank 290 and returned to the third sub tank 290 via the liquid channel 284, the first sub tank 220, the liquid channel 281, the degassing device 260, the first manifold 230, head 100, second manifold 240, and the second sub tank 210.

The bypass channel 270 connects the first manifold 230 and the second manifold 240. Further, the bypass channel 270 connects the upstream and the downstream of the head 100 in the circulation channel.

Further, the solenoid valves 232, 242, 271, and 272 configure a switch to switch between a first route and a second route. The bypass channel 270 configures a part of the circulation channel in the first route by shutting-off a channel between the head 100 and the circulation channel with the switch (solenoid valves 232, 242, 271, and 272). The head 100 configures a part of the circulation channel in the second route by shutting-off a channel between the bypass channel 270 and the circulation channel with the switch (solenoid valves 232, 242, 271, and 272).

That is, the first route is configured by closing the solenoid valves 232 and 242 and opening the solenoid valves 271 and 272. The bypass channel 270 is a part of the circulation channel and the heads 100 do not become a part of the circulation channel in the first route.

That is, the second route is configured by opening the solenoid valves 232 and 242 and closing the solenoid valves 271 and 272. The heads 100 become a part of the circulation channel and the bypass channel 270 is not a part of the circulation channel in the second route.

Further, the first sub tank 220, the second sub tank 210, the first supply pump 202, and the second supply pump 203 configures a pressure generator to generate pressure for circulating liquid in the circulation channel.

Next, the role of the gas chamber 220a of the first sub tank 220 and the gas chamber 210a of the second sub tank 210 are described below.

When the liquid supply apparatus 200 drives the first supply pump 202 and the second supply pump 203, a pressure change (pulsation) occurs. The first supply pump 202 communicates with first sub tank 220 and the third sub tank 290. The second supply pump 203 communicates with second sub tank 210 and the third sub tank 290. If this pressure change transmits to meniscus in the nozzle 104 through the liquid channel, it may cause a liquid leak from the nozzles 104 or an entering of bubbles into the nozzles 104.

Thus, an elastic component is necessary to suppress the pressure change (pulsation). Generally, air has a compressive characteristic and it thus become a compliance component. Accordingly, the liquid supply apparatus 200 can suppress the pressure change (pulsation) by including the gas chambers 220a and 210a.

Figure 6:
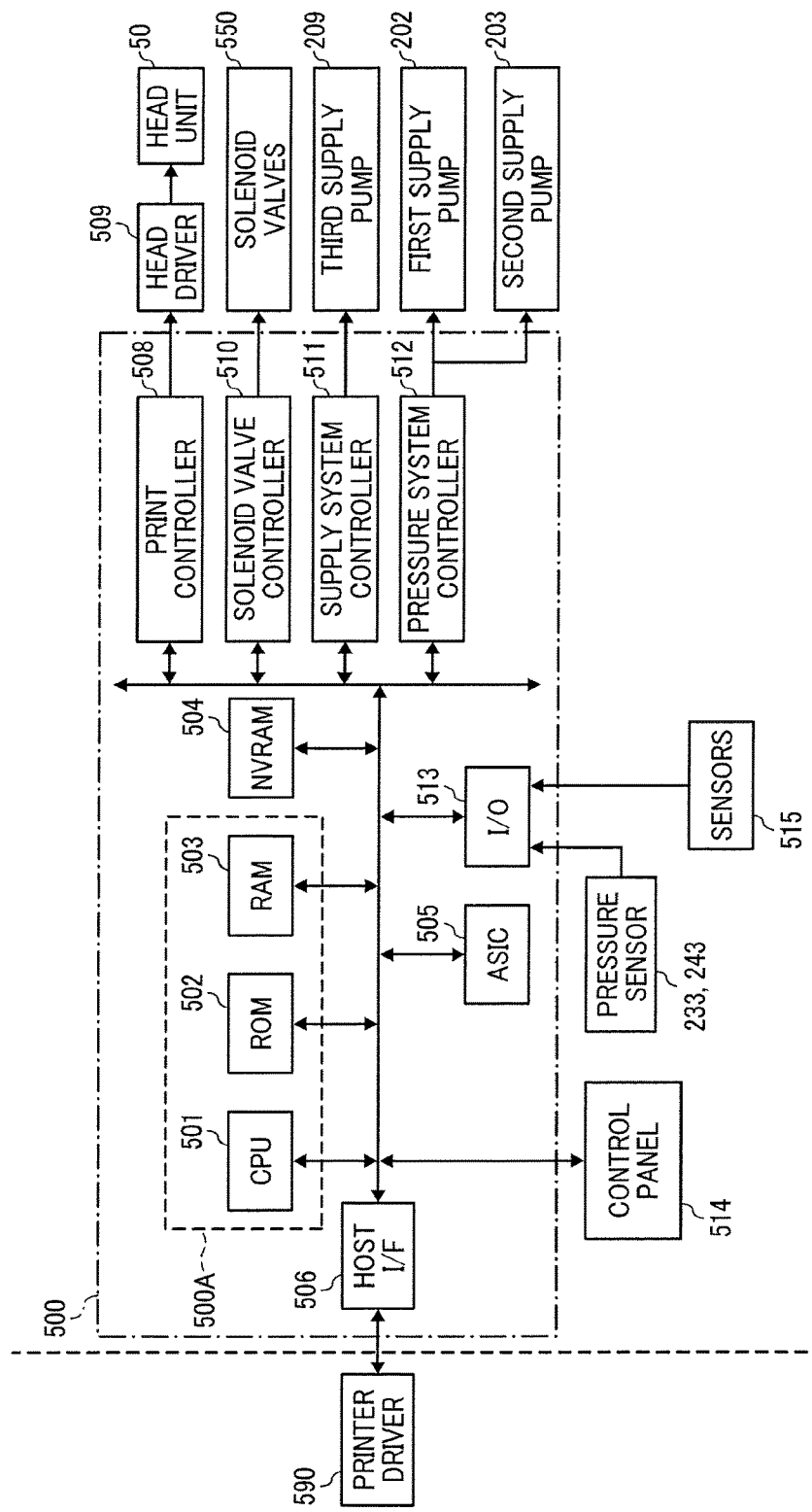
FIG. 6 is a block diagram of a controller of the liquid circulation system in the first embodiment.

Next, a controller (control circuitry) 500 in the present embodiment is described with reference to FIG. 6. FIG. 6 is a block diagram of the controller 500.

The controller 500 includes a main controller 500A including a central processing unit (CPU) 501, a read only memory (ROM) 502, and a random access memory (RAM) 503. The CPU 501 controls the overall apparatus. The ROM 502 stores fixed data including various programs to be executed by the CPU 501. The RAM 503 temporarily store data such as image data. The main controller 500A also serves as a degassing controller in the present embodiment.

The controller 500 includes a rewritable nonvolatile random access memory (NVRAM) 504 to retain data during the apparatus is powered off. The controller 500 includes an application-specific integrated circuit (ASIC) 505 to perform image processing, such as various signal processing and sorting, on image data and to process input/output signals to control the apparatus as a whole.

The controller 500 also includes a print controller 508 and a driver integrated circuit (hereinafter, head driver) 509. The print controller 508 includes a data transmitter, a drive signal generator, and a bias voltage output unit to drive and control each of the heads 100 of a head unit 50. The head driver 509 drives each of the heads 100.

The controller 500 includes a solenoid valve group 550 and a solenoid valve controller 510. The solenoid valve group 550 includes solenoid valves 232, 242, 271, and 272, and solenoid valves 212, 222, 292, 287, and 288. The solenoid valve controller 510 control driving of the solenoid valves 232, 242, 271, and 272, and the solenoid valves 212, 222, 292, 287, and 288.

The controller 500 includes a supply system controller 511 to control driving of the third supply pump 209.

The controller 500 includes a pressure system controller 512 to control driving of the first supply pump 202 and the second supply pump 203.

The controller 500 further includes an input/output (I/O) unit 513. The I/O unit 513 performs various sensor data and acquires detection results from the pressure sensors 233 and 243 and information from various types of sensors 515 mounted in the liquid discharge apparatus 1000. The I/O unit 513 also extracts data for controlling the liquid discharge apparatus 1000, and uses extracted data to control the print controller 508, the solenoid valve controller 510, the supply system controller 511, and the pressure system controller 512.

A control panel 514 used to input and display information necessary to the liquid discharge apparatus 1000 is connected to the controller 500.

Next, a liquid circulation method in the liquid circulation system (liquid supply apparatus 200) in the present disclosure is described.

(1) Liquid flow from the main tank 201 to the third sub tank 290. When the liquid detector 291 detects liquid shortage in the third sub tank 290, the controller 500 drives the third supply pump 209 to supply the liquid to the third sub tank 290 from the main tank 201 via the liquid channel 289 until the liquid detector 291 detects that the liquid level in the third sub tank 290 is full.

(2) Liquid flow from the third sub tank 290 to the first sub tank 220. The controller 500 supplies the liquid from the third sub tank 290 to the first sub tank 220 via the liquid channel 284 by driving the first supply pump 202.

(3) Liquid flow from the second sub tank 210 to the third sub tank 290. The controller 500 supplies the liquid from the second sub tank 210 to the third sub tank 290 via the liquid channel 283 by driving the second supply pump 203.

(4) Liquid flow from the first sub tank 220 to the second sub tank 210 through the liquid-circulatable heads 100. The controller 500 supplies the liquid to the first sub tank 220 by driving the first supply pump 202 until the pressure sensor 233 detects that pressure in the first manifold 230 becomes the target pressure (positive pressure, for example).

Further, the controller 500 supplies the liquid to the third sub tank 290 by driving the second supply pump 203 until the pressure sensor 243 detects that pressure in the second manifold 240 becomes the target pressure (negative pressure, for example).

Thereby, a differential pressure is generated between the first sub tank 220 and the second sub tank 210. According to this differential pressure, the liquid is circulatable from the first sub tank 220 to the second sub tank 210 via the liquid channel 281, the filter 261, the degassing device 260, the first manifold 230, a plurality of the supply channels 231, a plurality of the pressure head tanks 251, a plurality of heads 100, a plurality of discharge channels 241, a plurality of the decompression head tanks 252, the second manifold 240, and the liquid channel 282.

At this time, the controller 500 closes the solenoid valves 271 and 272 and opens the solenoid valves 232 and 242.

On the other hand, the liquid is circulatable from the first sub tank 220 to the second sub tank 210 via the liquid channel 281, the filter 261, the degassing device 260, the first manifold 230, the bypass channel 270, the second manifold 240, and the liquid channel 282. The controller 500 performs this liquid circulation by driving the first supply pump 202 and the second supply pump 203 while closing the solenoid valves 232 and 242 and opening the solenoid valves 271 and 272 to generate the differential pressure.

The liquid detectors 211, 221, and 291 may be a detector using a float, a detector using at least two electrodes to detect an existence of liquid according to a voltage output, or a detector of laser type.

Further, interior of the first sub tank 220, the second sub tank 210, and the third sub tank 290 may be communicated with outside air by driving the solenoid valves 222, 212, and 292.

Next, formation of negative pressure in the nozzle meniscus is described below.

Generally, the pressure applied to the nozzle meniscus is controlled to be negative when the head 100 discharges liquid. The negative pressure inside the nozzles prevents a leak or an overflow of liquid from the nozzles. Further, pulsation of the pressure may be generated in the nozzle meniscus at a start and an end of the discharge process when the high-speed discharge is performed. At this time, the negative pressure in the nozzles prevents a leak or an overflow of liquid from the nozzles even when the positive pressure is temporary generated in the nozzles by the pulsation.

When a circulation type liquid discharge head is used, generally, pressure in the first sub tank 220 is set to positive and pressure in the second sub tank 210 is set to negative.

More specifically, a fluid resistance Rin and a fluid resistance Rout are previously calculated or measured. The fluid resistance Rin is a fluid resistance from the first sub tank 220 to the nozzle 104 of the head 100. The fluid resistance R out is a fluid resistance from the nozzle 104 to the second sub tank 210. Then, pressure Pin of the first sub tank 220 and pressure Pout of the second sub tank 210 are set according to the fluid resistance Rin and Rout. Thereby, a target pressure Pn can be generated in the nozzle meniscus according to a fluid resistance ratio of Rin and Rout and a value of Pin and Pout, as similar to a voltage division of series resistance.

If a flow rate of circulated liquid is referred to as "I", $Pn-Pin=I \times Rin$ $Pout-Pn=I \times Rout$ Here, the following Equation 1 is obtained by deleting "I" from both sides of the above-described equations and transforming the above-described equations.

[Equation 1]

$Pn=(Pout+Rout/Rin \times Pin)/(1+Rout/Rin)$

Equation 1 becomes Pn=(Pout+Pin)/2 when Rin=Rout.

Thus, it is understood that the pressure in the nozzle meniscus is determined according to the set pressure and the fluid resistance ratio.

Figure 7:
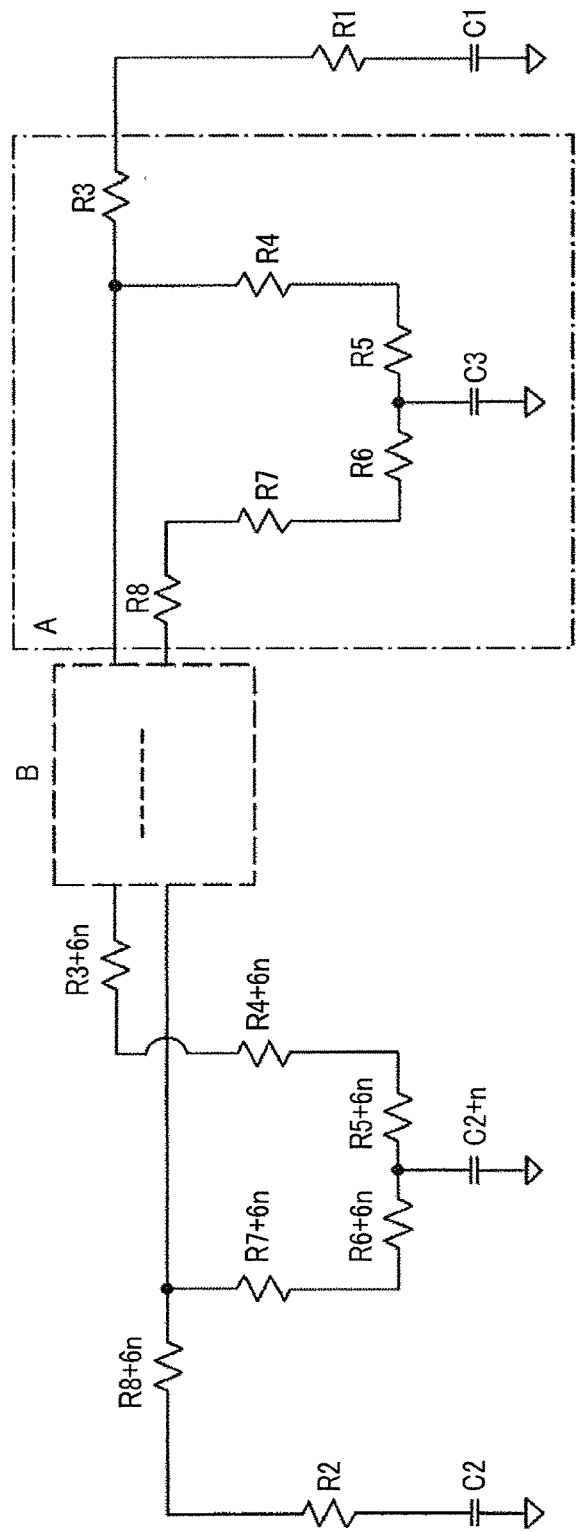
FIG. 7 is a schematic view of the first embodiment modeled as an equivalent circuit.

A schematic view of the liquid supply apparatus 200 modeled as an equivalent circuit is illustrated in FIG. 7.

Line head is assumed in this schematic view, and the head 100 is communicated with the supply channel 231 and a circulation channel (discharge channel) 241 in a module A in FIG. 7. A plurality of the module A is arranged in parallel within a frame B in FIG. 7.

Further, the first sub tank 220, the second sub tank 210, and the nozzle meniscus can be modeled as a capacitor component where the voltage accumulates. The liquid channels can be modeled as a resistance component that generates a voltage drop.

Thus, Rin can be represented by a resistance of the liquid channel 281 (R1), a resistance of a part of the first manifold 230 (R3), a resistance of the supply channel 231 (R4), and a resistance from the supply port 171 to the nozzle 104 of the head 100 (R5). On the other hand, Rout can be represented by a resistance from the nozzle 104 to the discharge port 181 of the head 100 (R6), a resistance of the discharge channel 241 (R7), a resistance of a part of the second manifold 240 (R8), and a resistance of the liquid channel 282 (R2).

Pin represents a voltage generated by a voltage source (air pump, for example) and a current source (liquid pump, for example) in the first sub tank 220.

Pout represents a voltage generated by a voltage source (air pump, for example) and a current source (liquid pump, for example) in the second sub tank 210.

Further, the resistance of the part of the first manifold 230 (R3 . . . R3+6n) and the resistance of the part of the second manifold 240 (R8 . . . R8+6n) are appropriately considered to calculate the pressure in the nozzle meniscus in each heads 100 according to a position where the first manifold 230 and the second manifold 240 are mounted. However, the resistance of the first manifold 230 and the second manifold 240 may be ignored in the calculation of the pressure in the nozzle meniscus because the resistance of the first manifold 230 and the second manifold 240 are small enough compare to the resistance of other channels.

The equivalent circuit may be different from that described above depending on the actual structure of the head. However, the equivalent circuit described above applies to most cases.

In the above-described description, the controller 500 applies a positive pressure to the first sub tank 220. However, the controller 500 may apply a negative pressure to the first sub tank 220 and control the negative pressure in the second sub tank 210 to be greater than the negative pressure in the first sub tank 220 to generate a differential pressure for liquid circulation.

The advantage of the present configuration is that the liquid can be circulated while reducing the liquid leakage from the nozzle compared to the above-described embodiments because the negative pressure is also applied to the first sub tank 220. However, a pressure fluctuation range in which the liquid is dischargeable may be narrowed when the fluid resistance in the head 100 is large because an initial negative pressure in the nozzle meniscus increases in the negative pressure side.

Here, in Equation 1, the ratio Rout/Rin of the fluid resistance Rout and Rin is represented as Rr (Rr=Rout/Rin) and is transformed to obtain the following Equation 2.

[Equation 2]

$$Pout = -Rr \times Pin + (1+Rr) \times Pn$$

Assuming that the pressure Pn of the nozzle meniscus is a constant value, Pout can be represented as a linear function of the Pin having an intercept of (1+Rr)×Pn and a slope of −Rr.

If Pin and Pout are set to satisfy the above relation, the differential pressure (Pin−Pout) that circulates the liquid can be increased or decreased while keeping the pressure in the nozzle meniscus constant.

On the other hand, if the pressure increases to be outside the range of the Equation 2 in the positive direction, liquid easily leaks from the nozzles. Conversely, if the pressure decreases to be outside the range of the Equation 2 in the negative direction, bubbles easily enter into the nozzles to cause a malfunction.

Therefore, it is important to vary the differential pressure while keeping to the targeted pressure in the nozzle meniscus.

Next, a degassing operation in the first embodiment is described.

A region where a degassing degree tends to decrease is an area around the first sub tank 220 and the second sub tank 210, where there is a gas-liquid interface.

Therefore, if the liquid having low degassing degree existed around and in the first sub tank 220 and the second sub tank 210 is supplied to the head 100 for circulation, the gas in the liquid may generate bubbles in the head 100.

Thus, in the first step, a first route is configured to increase the degassing degree in the liquid by performing a first degassing operation that circulates the liquid in the channel having low degassing degree without flowing through the heads 100. The first route includes the bypass channel 270 as a part of the circulation channel.

Next, controlling the first degassing operation (process) in the present embodiment is described with reference to a flowchart in FIG. 8.

First, the controller 500 closes the solenoid valves 271, 232, 272 and 242 (step S1). Next, the controller 500 starts to drive the first supply pump 202 and the second supply pump 203 (steps S2 and S3).

Then, the controller 500 determines whether the pressure in the first manifold 230 reaches the target pressure Pin from the readings provided by the pressure sensor 233 (step S4). At this time, if the pressure does not reach the target pressure Pin, the controller 500 determines whether a predetermined time has passed (step S5).

Similarly, the controller 500 determines whether the pressure in the second manifold 240 reaches the target pressure Pout from the readings provided by the pressure sensor 243 (step S7). At this time, if the pressure does not reach the target pressure Pout, the controller 500 determines whether a predetermined time has passed (step S8).

Then, if the pressure does not reach the target pressure Pin or Pout even when the predetermined time has passed, the controller 500 displays an error on the control panel 514 (steps S6 and S9). That is, when the pressure does not reach the target pressure Pin and Pout even when the predetermined time has passed, failure may be considered such as a failure in the first supply pump 202 and the second supply pump 203 served as a driving source, an air leak from a piping, ink leak from damaged parts. Thus, the controller 500 displays error in this case (when the pressure does not reach the target pressure Pin and Pout even when the predetermined time has passed).

Then, if the pressure reaches the target pressure Pin or Pout within the predetermined time, the controller 500 opens the solenoid valves 271 and 272 to open the bypass channel 270 so that the first manifold 230 and the second manifold 240 communicates with each other (steps S10).

Thereby, the liquid circulation process starts in the first route in which the liquid flows from the first sub tank 220 and returns to the first sub tank 220 via the liquid channel 281, the first manifold 230, the bypass channel 270, the second manifold 240, the liquid channel 282, and the second sub tank 210.

The first degassing process ends when a circulation process has been performed for a predetermined time (S11, YES).

In the following, a specific process of controlling the pressure to the target pressure is described.

The controller 500 may control the pressure to achieve the target pressure by feeding back the detection results of the pressure sensors 233 and 244 to the controller 500. Then, the controller 500 may sequentially control the supply amount of the first supply pump 202 and the second supply pump 203.

The supply amount of the first supply pump 202 and the second supply pump 203 may be controlled using a control method represented by PID (Proportional Integral Derivation) control.

For example, deviation between each detected values (detected pressure) by the pressure sensors 233 and 243 and the target value (target pressure) is used for controlling the supply amount of the first supply pump 202 and the second supply pump 203 in the PID control.

Next, setting of circulation amount is described.

It is previously calculated or measured how much time the circulation has to be performed according to a liquid capacity of the liquid circulation system (liquid supply apparatus 200) and a degassing performance of the degassing device 260. Then, the controller 500 previously determines how much time the degassing process is to be performed. It is preferable to perform the circulation for the time equal to or longer than the previously determined time to replace the liquid in the liquid circulation system to the liquid with increased degassing degree.

After performing the circulation process for the predetermined time, it is preferable to release the pressure in the liquid supply apparatus 200 for preparing for the next second stage of the degassing operation (degassing process). For example, the controller 500 closes the solenoid valves 271 and 272 and opens the solenoid valves 212, 222, and 292 provided on each air release mechanisms of the first sub tank 220, the second sub tank 210, and the third sub tank 290 to set the pressure in the liquid supply apparatus 200 to atmospheric pressure.

Next, after performing the first degassing operation as described-above, the second route is configured by separating the bypass channel 270 from the circulation channel and joining the heads 100 as part of the circulation channel. Then, the second degassing operation to circulate the liquid in the liquid supply apparatus 200 is performed.

Figure 9A:
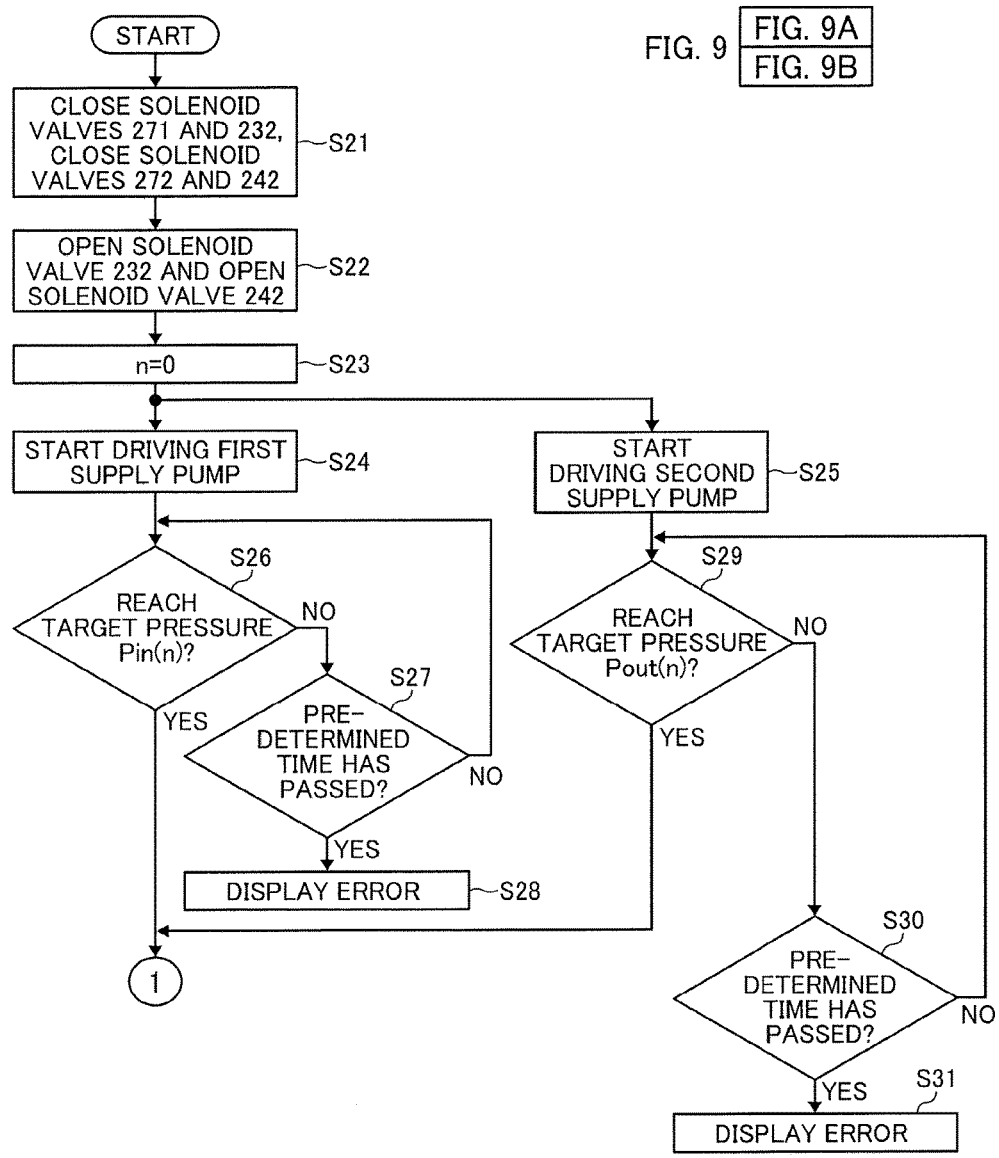
FIGS. 9A and 9B are flowcharts of a second degassing operation in the first embodiment.
Figure 9B:
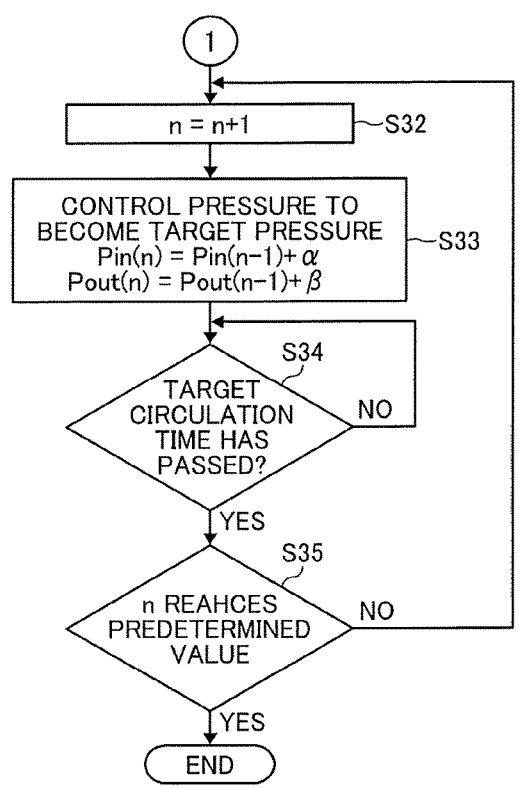

Next, controlling the second degassing operation (process) in the present embodiment is described with reference to flowcharts in FIGS. 9A and 9B.

First, the controller 500 closes the solenoid valves 271, 232, 272 and 242 (step S21). Next, the controller 500 opens the solenoid valves 232 and 242 (step S22). The liquid circulation starts by generating pressure in the liquid supply apparatus 200 under this condition (joining the heads 100 as part of the circulation channel).

Next, "n" is reset to zero (n=0) (step S23). "n" is a predetermined number when the pressure is increased gradually from the smaller side.

Next, the controller 500 starts to drive the first supply pump 202 and the second supply pump 203 (steps S24 and S25).

Then, the controller 500 determines whether the pressure in the first manifold 230 reaches the target pressure Pin(n) from the readings provided by the pressure sensor 233 (step S26). At this time, if the pressure does not reach the target pressure Pin(n), the controller 500 determines whether a predetermined time has passed (step S27). If the predetermined time has not passed, the controller 500 returns to determine whether the pressure reaches the target pressure Pin(n) (step S27, NO).

Similarly, it is determined that the pressure reaches the target pressure Pout(n) from the readings provided by the pressure sensor 243 (step S29). At this time, if the pressure does not reach the target pressure Pout(n), the controller 500 determines whether a predetermined time has passed (step S30). If the predetermined time has not passed, the controller 500 returns to determine whether the pressure reaches the target pressure Pout(n) (step S30, NO).

Figure 8:
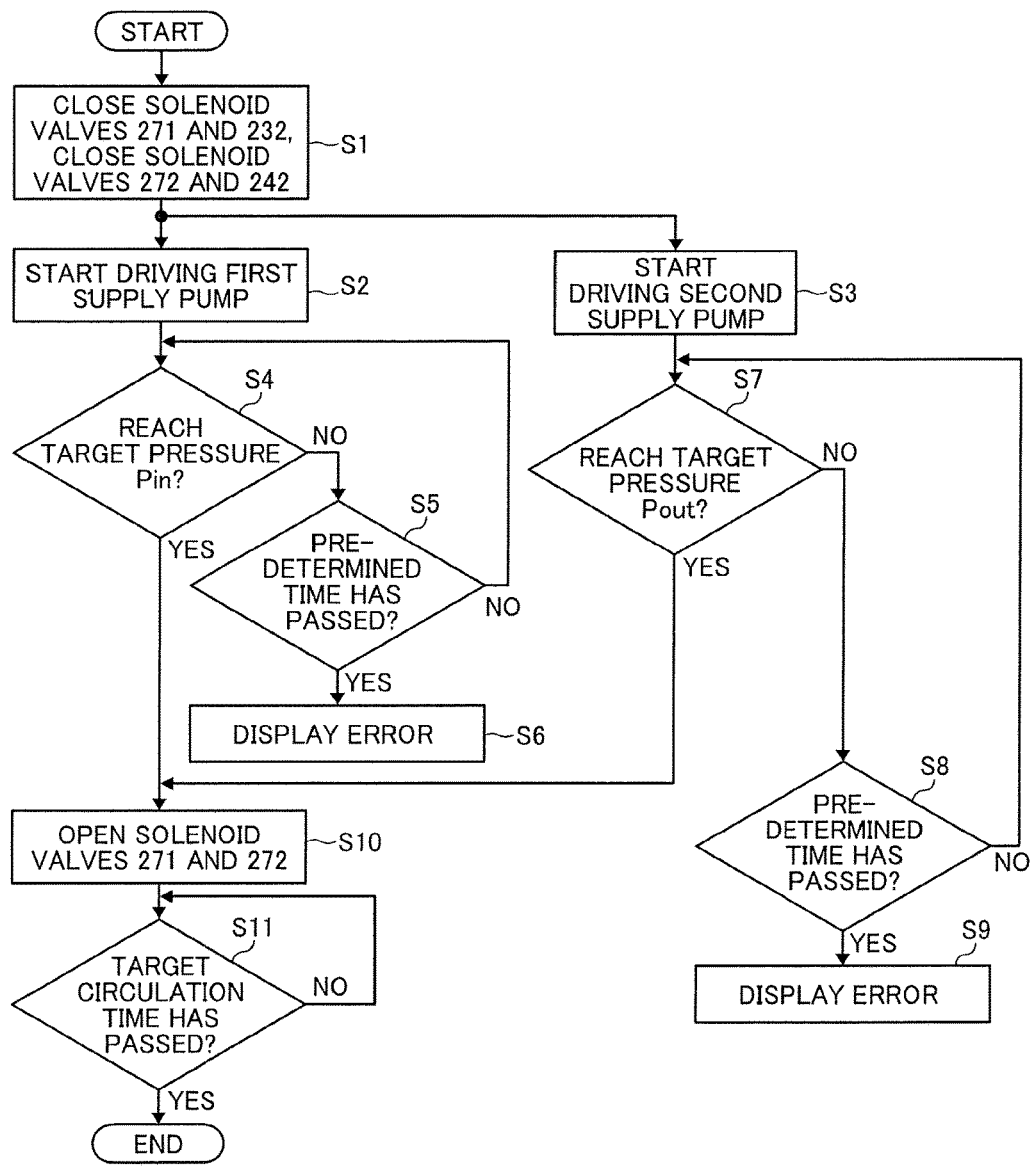
FIG. 8 is a flowchart of a first degassing operation in the first embodiment.

Then, if the pressure does not reach the target pressure Pin or Pout even after the predetermined time has passed, the controller 500 displays an error on the control panel 514 (steps S28 and S31) as in the first step in FIG. 8.

If the pressure reaches the target pressure Pin(n) and Pout(n) within a predetermined time, the controller 500 sets "n" to be "n=(n+1)" (step S32). The controller 500 further controls the pressure detected by the pressure sensor 233 to be the target pressure Pin(n)=Pin(n−1)+α and controls the pressure detected by the pressure sensor 243 to be the target pressure Pout(n)=Pout(n−1)+β as illustrated in the step S33 in FIG. 9B.

That is, a new target pressure is set by adding α to the target pressure Pin and adding β to the target pressure Pout for every time "n" is incremented (+1). Then, the controller 500 controls the pressure in the liquid supply apparatus 200 to become the new target pressure.

After performing a liquid circulation for a predetermined target circulation time (step S34), the controller 500 determines whether "n" reaches a predetermined value (step S35) and repeats the above-described processes of incrementing the value "n" (+1) (step S32) and controlling the pressure to target pressure (step S33) until "n" reaches the predetermined value (step S35, YES).

In this way, when the second degassing operation is performed, the controller 500 starts from the pressure lower than the target pressure Pin and Pout of the first degassing operation. Thus, the controller 500 controls to start the liquid circulation with the pressure lower than the pressure in the first degassing operation.

Thereby, the liquid around the head 100 having low degassing degree and the liquid degassed by the first degassing operation having higher degassing degree are mixed slowly. Thus, the present embodiment can reduce generation of bubbles generated by rapid mixing of the liquid.

In the second degassing operation, the controller 500 gradually (i.e., continuously) increases the pressure for circulating the liquid from the lower side to gradually increase a circulation flow rate.

Thereby, the controller 500 can reduce the time for degassing the channels in the liquid supply apparatus 200 by increasing the circulation flow rate while preventing the generation of bubbles from the liquid of low degassing degree in the heads 100 as described above. Thus, the present embodiment can prevent the generation of bubbles and improve the degassing efficiency.

Bubbles may be generated from the liquid having low degassing degree because decompressed pressure in the second sub tank 210 is applied to the discharge port 181 of the heads 100. Once the bubbles have been generated, it takes time to dissolve the bubbles in the liquid even when the liquid having high degassing degree by the first step flows. Further, the liquid with dissolved bubbles has to be degassed again, thus further increasing the time it takes for degassing.

Thus, to prevent air bubbling, in the initial stage of the second degassing operation, small decompression and small pressurization accompanied with the small decompression are applied. Then, the controller 500 increases the pressure when the liquid with low degassing degree is replaced with the liquid degassed by the first degassing operation.

In this way, the controller 500 controls to replace the liquid with low degassing degree with the liquid with high degassing degree in the supply channel 231, an interior of the head 100, and the discharge channel 241. In this way, the controller 500 controls to replace the liquid with low degassing degree with the liquid with high degassing degree in the supply channel 231, an interior of the head 100, and the discharge channel 241.

The above-described control can prevent the generation of bubbles at the discharge port side, replace the liquid with low degassing degree with the liquid with high degassing degree in a short time, and reduce the degassing time.

In the above-described second degassing operation, a predetermined pressure (α and β) is added to the target pressure (Pin and Pout) of the previous stage every time "n" increases.

In this case, the above-described process gradually changes the target pressure. However, the target pressure may be continuously changed with a required inclination.

Further, as described above, the controller 500 changes the pressure to satisfy the following Equation 3 between the pressure Pout and the pressure Pin.

[Equation 3]

$$Pout = -Rr \times Pin + (1+Rr) \times Pn$$

Assuming that the pressure Pn of the nozzle meniscus is a constant value, Pout can be represented as a linear function of the Pin having an intercept of $(1+Rr) \times Pn$ and a slope of $-Rr$.

If Pin and Pout are set to satisfy the above relation, the differential pressure (Pin−Pout) can be increased or decreased while keeping the pressure in the nozzle meniscus constant.

On the other hand, if the pressure increases in the positive direction outside the range of Equation 3, ink may leak from the nozzles 104. Conversely, if the pressure decreases outside the range of the Equation 2 in the negative direction, bubbles easily enter into the nozzles to cause a malfunction.

Therefore, it is important to vary the differential pressure while keeping the targeted pressure in the nozzle meniscus. Further, if the differential pressure is increased, it is possible to increase the flow rate while keeping the pressure in the nozzle meniscus.

The relationship between the differential pressure and the pressure in the nozzle meniscus is illustrated in FIG. 10. FIG. 10 is a graph that illustrates the pressure in nozzle meniscus and contour line of flow rate when Rr=1. Hereinafter, the pressure in the nozzle meniscus is simply referred to as "meniscus pressure".

For example, the meniscus pressure Pn is −1 kPa when Rr=1 and the intercept is −2 kPa. At this time, the contour becomes a linear function having intercept of −2 kPa and slope of −1. The differential pressure increases with the increase of the positive pressure and negative pressure (increase in the lower right direction), and the flow rate also increases. The controller 500 can increase the flow rate while keeping the meniscus pressure constant as long as the above-described relation of Equation 3, Pout=−1×Pin+2× Pn, is kept.

Similarly, the controller 500 can increase the flow rate while keeping the meniscus pressure 0 kPa when the intercept is 0 kPa. The relational equation at this time becomes Pout=−1×Pin.

In this way, the controller 500 performs circulation before the head 100 discharges liquid or before printing starts to increase the degassing degree of the liquid. Thus, the liquid circulation system (liquid supply apparatus 200) of the present embodiment can reduce the influence of bubbles and increase reliability even when gas-liquid interface exists in the liquid circulation system.

At this time, total degassing time can be reduced by switching a liquid circulation route during degassing or by gradually changing the pressure.

Further, the liquid circulation system (liquid supply apparatus 200) of the present embodiment can release the pressure in the liquid circulation system by opening the solenoid valves 287 and 288 provided on the reverse liquid channel 285 and 286 with reference to the detection value of the pressure sensors 233 and 243 when the first sub tank 220 and the second sub tank 210 is excessively pressurized or decompressed.

That is, the second sub tank 210 and the third sub tank 290 communicate via the reverse liquid channel 285 by opening the solenoid valve 287. Further, the third sub tank 290 and the first sub tank 220 communicate via the reverse liquid channel 286 by opening the solenoid valve 288.

Thus, the excessive pressure in the liquid circulation system (liquid supply apparatus 200) can be released even when a one-way pump such as a diaphragm pump is used for the first supply pump 202 and the second supply pump 203. Especially, a diaphragm pump lasts ten times longer than a tubing pump that can supply the liquid bi-directionally. Thus, the useful life of the liquid supply apparatus 200 can be extended by using the diaphragm pump.

Next, a part related to a liquid circulation system (liquid supply apparatus 200) in a second embodiment of the present disclosure is described below with reference to FIG. 11.

Figure 11:
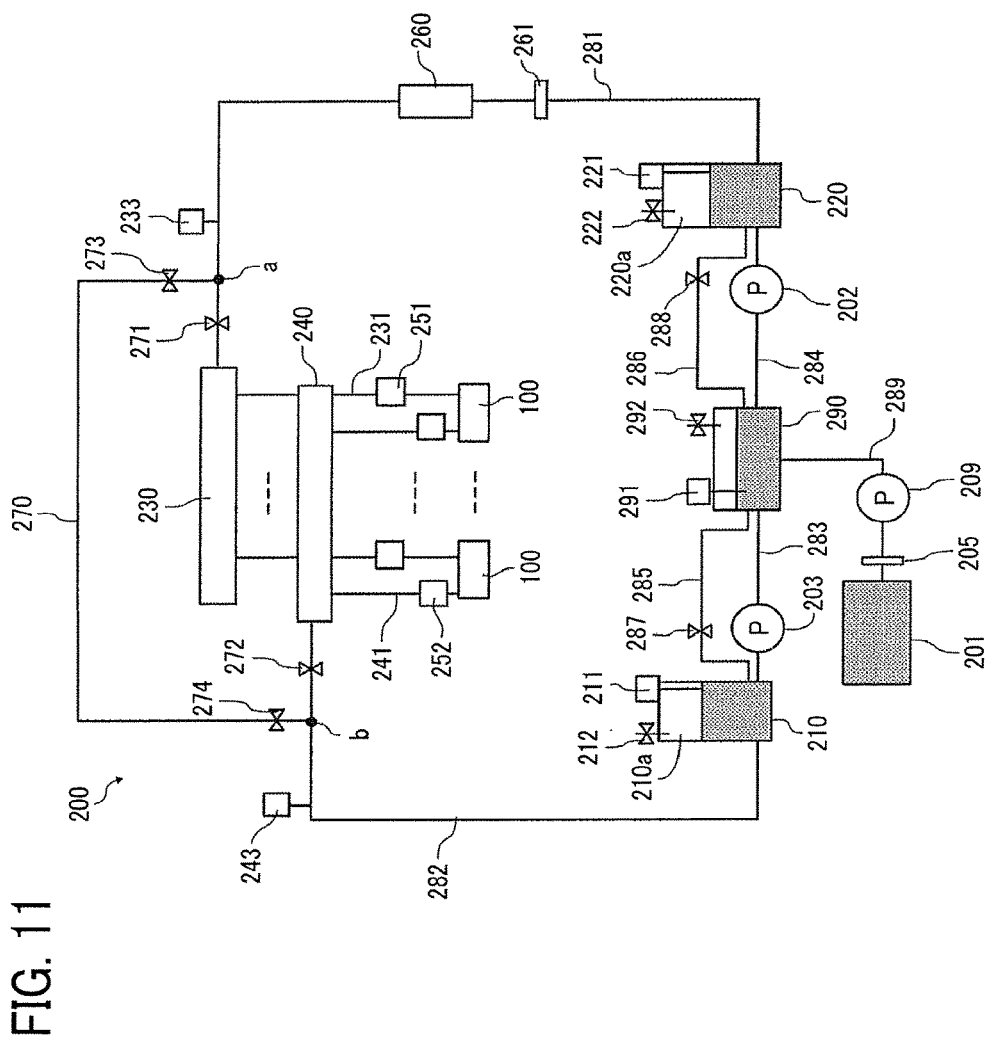
FIG. 11 is a schematic view of a liquid circulation system according to a second embodiment of the present disclosure.

FIG. 11 is a block diagram of the liquid circulation system (liquid supply apparatus 200). In the second embodiment, one end of the bypass channel 270 is connected to the liquid channel 281 at a first connection point (indicated as "a" in FIG. 11). The first connection point "a" is disposed between the first manifold 230 and the degassing device 260. The liquid channel 281 serves as "a first liquid channel" disposed upstream of the first manifold 230. Another end of the bypass channel 270 is connected to the liquid channel 282 at a second connection point (indicated as "b" in FIG. 11). The second connection point "b" is disposed between the second manifold 240 and the second sub tank 210. The liquid channel 282 serves as "a second liquid channel" disposed downstream of the second manifold 240.

The solenoid valve 271 is disposed between the first connection point "a" and the first manifold 230. The solenoid valve 272 is disposed between the second connection point "b" and the second manifold 240.

Further, a solenoid valve 273 is provided at the first connection point "a" side of the bypass channel 270, and a solenoid valve 274 is provided at the second connection point "b" side of the bypass channel 270.

The first route is configured by closing the solenoid valves 271 and 272 and opening the solenoid valves 273 and 274. The bypass channel 270 is a part of the circulation channel and the first manifold 230, the second manifold 240, and the heads 100 do not become a part of the circulation channel in the first route.

The second route is configured by opening the solenoid valves 271 and 272 and closing the solenoid valves 273 and 274. The first manifold 230, the second manifold 240, and the heads 100 become a part of the circulation channel and the bypass channel 270 is not a part of the circulation channel in the second route.

Here, the solenoid valves 271 and 273 may be configured by one three-way solenoid valve. The solenoid valves 272 and 274 may also be configured by one three-way solenoid valve.

Further, the pressure sensor 233 is disposed at a position upstream of the first connection point "a" to detect the pressure in the liquid channel 281. The pressure sensor 243 is disposed at a position downstream of the second connection point "b" to detect the pressure in the liquid channel 282.

In the present embodiment, one end of the bypass channel 270 is connected to the liquid channel 281 at a first connection point (indicated as "a" in FIG. 11) as a start point. The first connection point "a" is disposed upstream of the first manifold 230 and downstream of the first sub tank 220.

Another end of the bypass channel 270 is connected to the liquid channel 282 at a second connection point (indicated as "b" in FIG. 11) as an end point. The second connection point "b" is disposed downstream of the second manifold 240 and upstream of the second sub tank 210.

In the above-described first embodiment, it is necessary to provide the solenoid valves 232 and 242 for the supply channels 231 and the discharge channels 241, respectively. By contrast, in the present second embodiment, one common solenoid valve 271 can serve as two solenoid valves 232 and 242. Further, one common solenoid valve 272 can serve as two solenoid valves 232 and 242. Thus, the present embodiment can simplify the configuration and save the space.

Circulation control of a controller (control circuitry) 500 in the present second embodiment is similar to the circulation control of the first embodiment. However, the solenoid valve controller 510 controls to drive the solenoid valves 273 and 274 with the above-described change in the configuration of the solenoid valves. Here, the second embodiment does not have the solenoid valves 232 and 242 in the first embodiment.

In the present embodiment, the bubbles are easily generated immediately downstream of the second manifold 240 (in the vicinity of the solenoid valve 272) when the circulation channel is switched from the first route to the second route. Therefore, it is preferable to open the solenoid valve 272 slowly when switch the circulation channel from the first route to the second route. Thereby, the second embodiment can mix the liquid of different degassing degree slowly to prevent generation of bubbles. In order to open the solenoid valve 272 slowly, a solenoid valve having a controllable opening degree is used for the solenoid valve 272. The opening degree is gradually increased to open the solenoid valve 272 slowly.

When the circulation channel is switched from the first route to the second route, the solenoid valve 271 as a first valve and the solenoid valve 272 as a second valve are opened. At this time, it is preferable to open the solenoid valve 272 first and open the solenoid valve 271 next. If there is a failure in the pressure control of the first route and the second route, the bubbles may be generated by rapid mixing of the liquid with different degassing degrees when opening the solenoid valves 271 and 271.

However, if a generation point of the bubbles is at the solenoid valve 272 side, the liquid can flow through the degassing device 260 before the liquid flows into the heads 100. Thus, opening the solenoid valve 272 first can reduce the bubbles to enter into the heads 100. Further, the bubbles may be disappeared by mixed with air inside each sub tanks (the first sub tank 220, the second sub tank 210, and the third sub tank 290).

Next, controlling the first degassing operation (process) in the present embodiment is described with reference to a flowchart in FIG. 12.

First, the controller 500 closes the solenoid valves 271, 273, 272, and 274 (step S41). Next, the controller 500 starts to drive the first supply pump 202 and the second supply pump 203 (steps S42 and S43).

Then, the controller 500 determines whether the pressure in the first manifold 230 reaches the target pressure Pin from the readings provided by the pressure sensor 233 (step S44). At this time, if the pressure does not reach the target pressure Pin, the controller 500 determines whether a predetermined time has passed (step S45).

Similarly, the controller 500 determines whether the pressure in the second manifold 240 reaches the target pressure Pout from the readings provided by the pressure sensor 243 (step S47). At this time, if the pressure does not reach the target pressure Pout, the controller 500 determines whether a predetermined time has passed (step S48).

Then, if the pressure does not reach the target pressure Pin or Pout even when the predetermined time has passed, the controller 500 displays an error on the control panel 514 (steps S46 and S49).

Then, when the pressure reaches the target pressure Pin or Pout within the predetermined time, the controller 500 opens the solenoid valves 273 and 274 to open the bypass channel 270 so that the first sub tank 220 and the second sub tank 210 communicates with each other (step S50).

Thereby, the liquid circulation process starts via the bypass channel 270 from the first sub tank 220 to the second sub tank 210.

Then, the first degassing process ends when a circulation process has been performed for a predetermined time (S51, YES).

Here, the control operation toward the target pressure and the setting amount of circulation is similar to the above-described first embodiment.

After performing the circulation process for the predetermined time, it is preferable to release the pressure in the liquid supply apparatus 200 for preparing for the next second stage of the degassing operation (degassing process). For example, the controller 500 closes the solenoid valves 271 and 272 and opens the solenoid valves 212 and 222 provided on each air release mechanisms of the first sub tank 220 and the second sub tank 210 in the liquid supply apparatus 200 to atmospheric pressure.

Next, controlling the second degassing operation (process) in the present embodiment is described with reference to flowcharts in FIGS. 13A and 13B.

First, the controller 500 closes the solenoid valves 271, 232, 272 and 274 (step S61). Next, the controller 500 opens the solenoid valves 232 and 272 (step S62). The liquid circulation starts by generating pressure in the liquid supply apparatus 200 under this condition Next, "n" is reset to zero (n=0) (step S63). "n" is a predetermined number when the pressure is increased gradually from the smaller side.

Next, the controller 500 starts to drive the first supply pump 202 and the second supply pump 203 (steps S64 and S65).

Then, the controller 500 determines whether the pressure in the liquid channel 281 reaches the target pressure Pin(n) from the readings provided by the pressure sensor 233 (step S66). At this time, if the pressure does not reach the target pressure Pin(n), the controller 500 determines whether a predetermined time has passed (step S67).

Similarly, it is determined that the pressure in the liquid channel 282 reaches the target pressure Pout(n) from the readings provided by the pressure sensor 243 (step S69). At this time, if the pressure does not reach the target pressure Pout(n), the controller 500 determines whether a predetermined time has passed (step S70).

Figure 12:
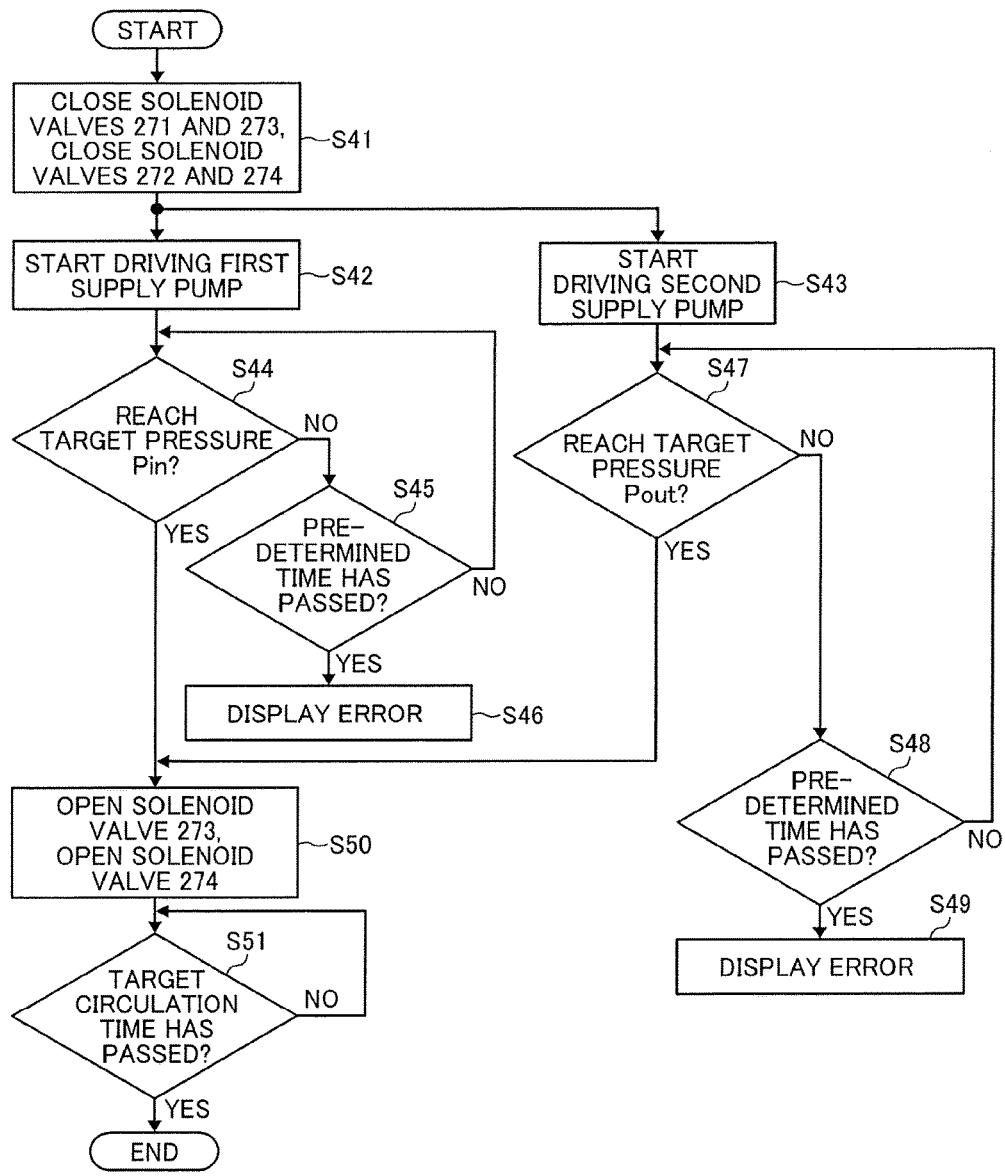
FIG. 12 is a flowchart of a control in a first degassing operation in the second embodiment.

Then, if the pressure does not reach the target pressure Pin or Pout even when the predetermined time has passed, the controller 500 displays an error on the control panel 514 (steps S68 and S71) as in the above-described first step in FIG. 12.

Figure 13A:
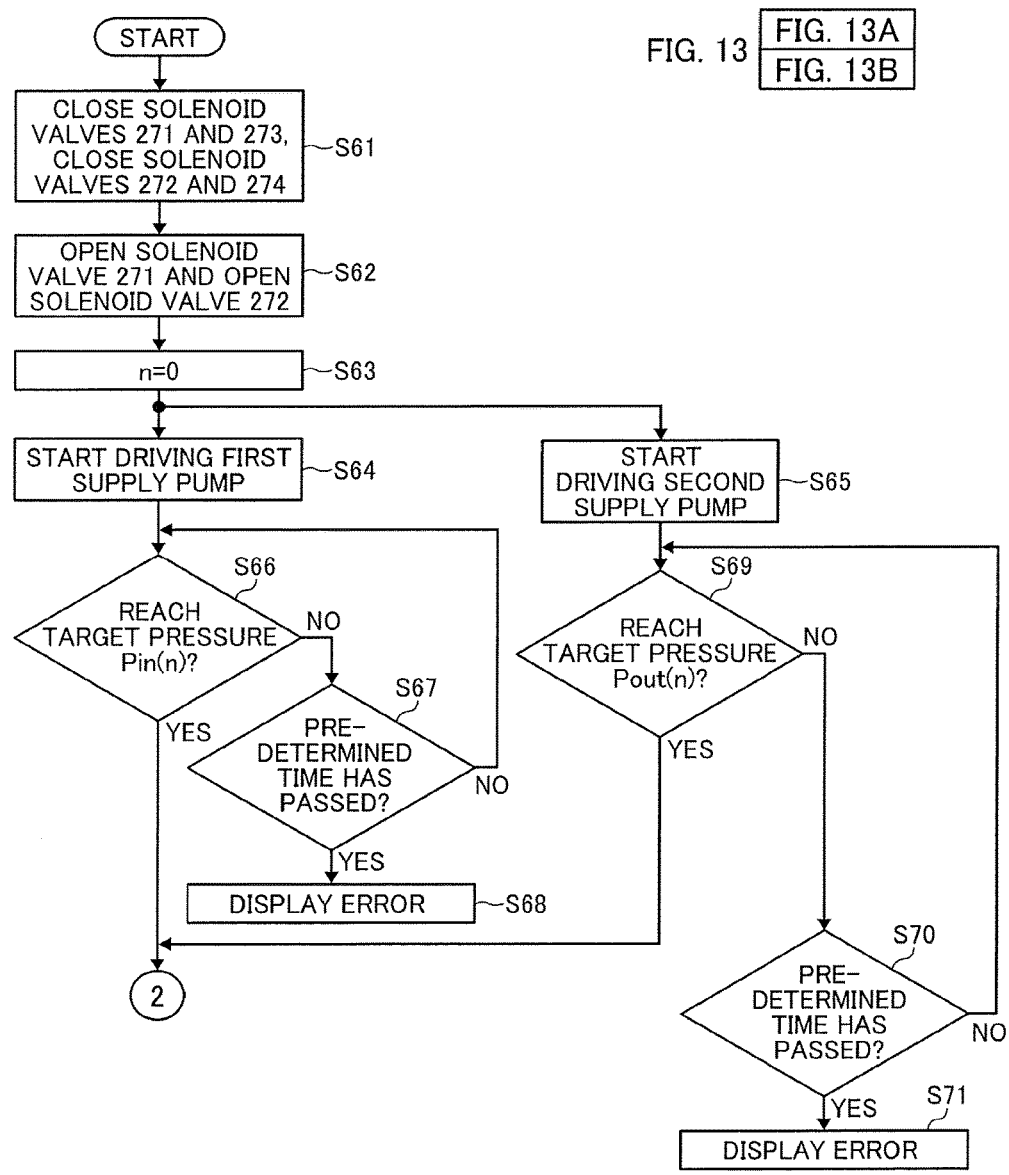
FIGS. 13A and 13B are flowcharts of a second degassing operation in the second embodiment.
Figure 13B:
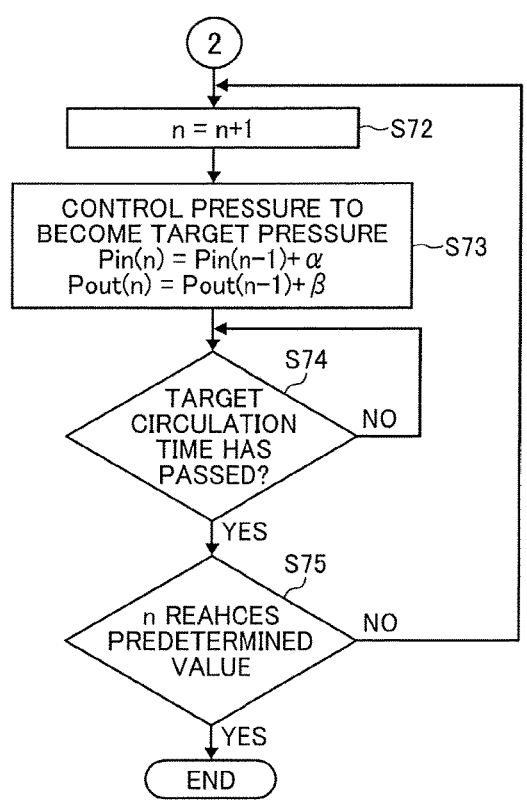

If the pressure reaches the target pressure Pin(n) and Pout(n) within a predetermined time, the controller 500 sets "n" to be "n=(n+1)" (step S72 in FIG. 13B). The controller 500 further controls the pressure detected by the pressure sensor 233 to be the target pressure Pin(n)=Pin(n−1)+α and controls the pressure detected by the pressure sensor 243 to be the target pressure Pout(n)=Pout(n−1)+β as illustrated in the step S73 in FIG. 13B.

That is, a new target pressure is set by adding α to the target pressure Pin and adding β to the target pressure Pout for every time "n" is incremented (+1). Then, the controller 500 controls the pressure in the liquid supply apparatus 200 to become the new target pressure.

As illustrated in FIG. 13B, after performing a liquid circulation process for the predetermined target circulation time (step S74), the controller 500 determines whether "n"

reaches a predetermined value (step S75) and repeats the above-described processes of incrementing the value "n" (+1) (step S72) and controlling the pressure to target pressure (step S73) until "n" reaches the predetermined value (step S75, YES).

In this way, when the second degassing operation is performed, the controller 500 starts from the pressure lower than the target pressure Pin and Pout of the first degassing operation. Thereby, the controller 500 in the present embodiment can reduce the generation of the bubbles in the liquid supply apparatus 200. In the second degassing operation, the controller 500 gradually (continuously) increases the pressure for circulating the liquid from the lower side to gradually increase a circulation flow rate. Thus, the present embodiment can reduce the time necessary for the degassing process. Thereby, the present embodiment can suppress the generation of the bubbles and increase the degassing efficiency.

Next, a part related to a liquid circulation system (liquid supply apparatus 200) in a third embodiment of the present disclosure is described below with reference to FIG. 14.

Figure 14:
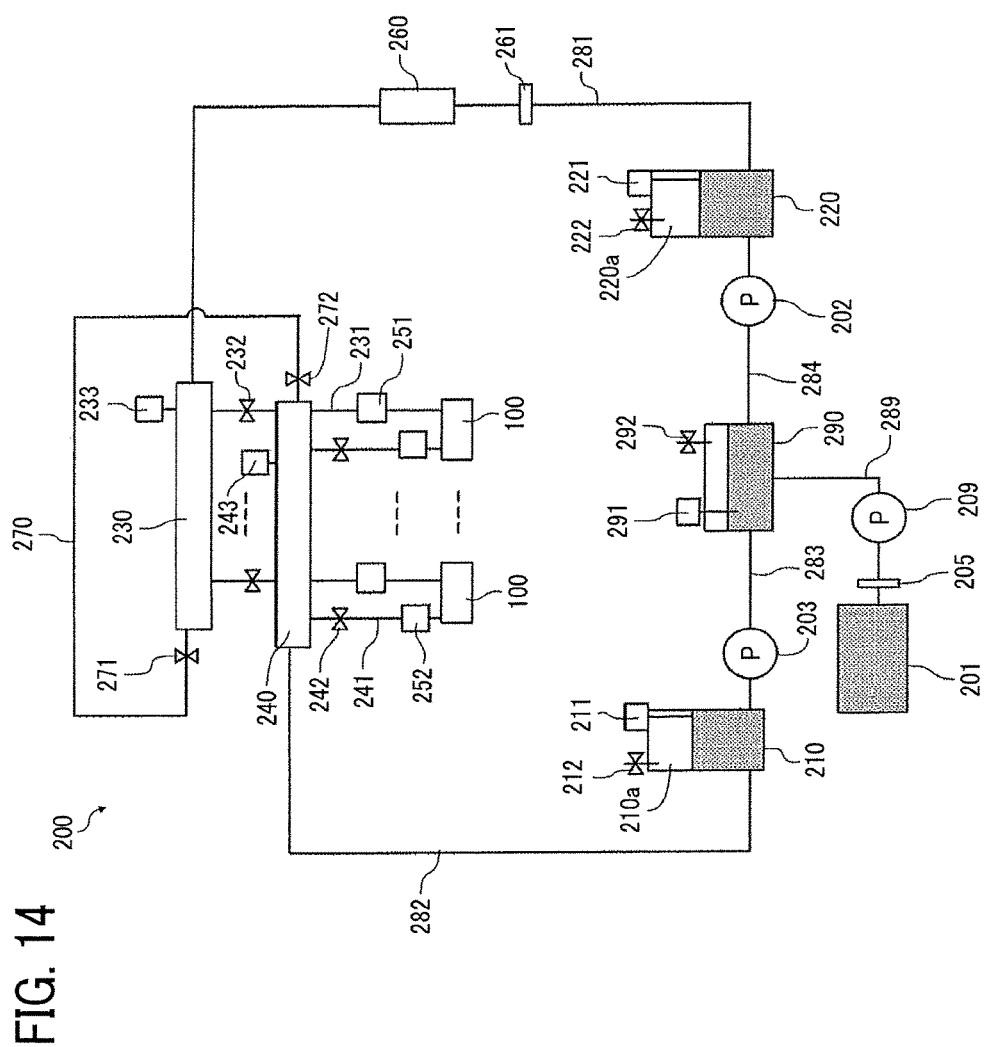
FIG. 14 is a schematic view of a liquid circulation system according to a third embodiment of the present disclosure.

FIG. 14 is a block diagram of the liquid circulation system. In the present embodiment, a reversible pump, such as a tubing pump, is used as the first supply pump 202 and the second supply pump 203 in the above-described first embodiment as illustrated in FIG. 5. Thus, even when the first sub tank 220 and the second sub tank 210 are excessively pressurized or decompressed, the excessive positive or negative pressure can be released by reversely driving the first supply pump 202 and the second supply pump 203.

Thus, the reverse liquid channels 285 and 286, and the solenoid valves 287 and 288 as described in the above-described first embodiment become unnecessary. Thus, the configuration is simplified.

Next, a part related to a liquid circulation system (liquid supply apparatus 200) in a fourth embodiment of the present disclosure is described below with reference to FIG. 15.

Figure 15:
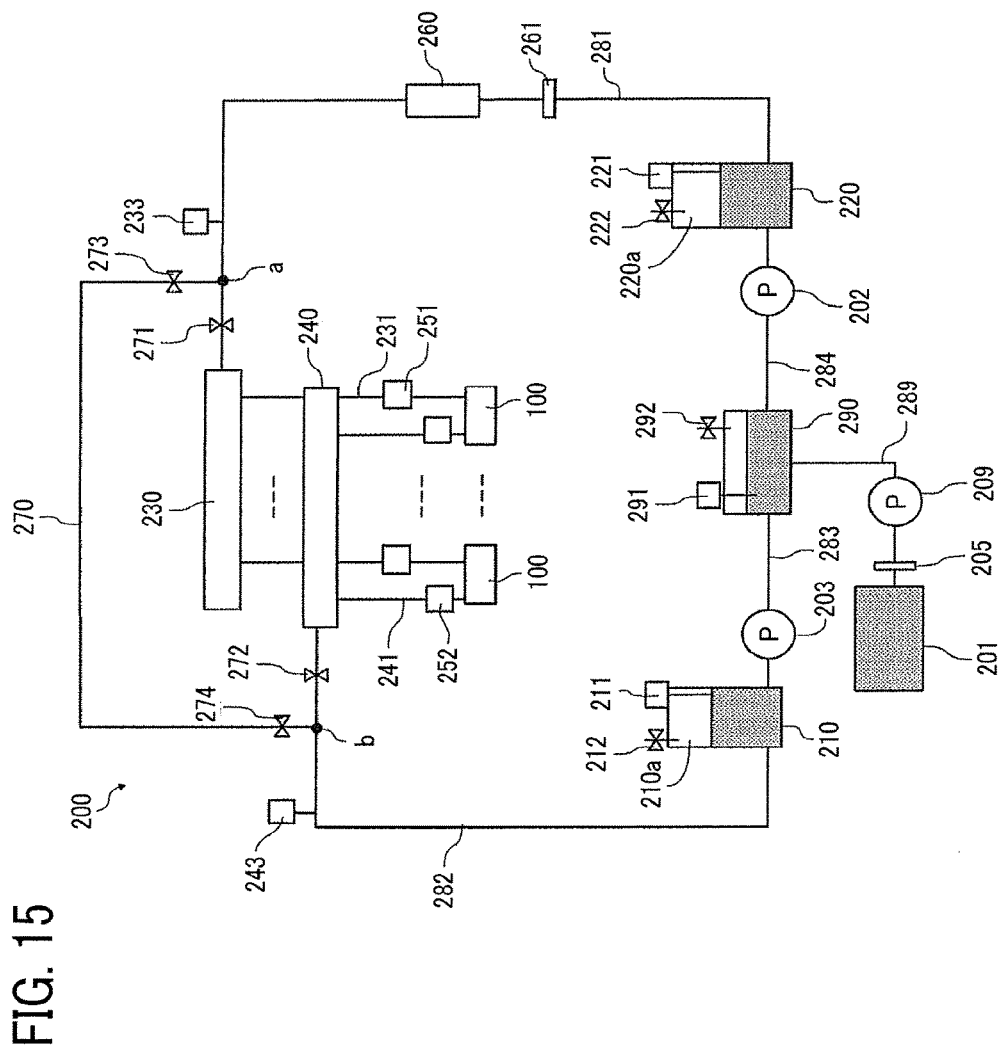
FIG. 15 is a schematic view of a liquid circulation system according to a fourth embodiment of the present disclosure.

FIG. 15 is a block diagram of the liquid circulation system. In the present embodiment, as similar to the above-described third embodiment illustrated in FIG. 14, a reversible pump, such as a tubing pump, is used as the first supply pump 202 and the second supply pump 203 in the second embodiment illustrated in FIG. 11.

Thus, the reverse liquid channels 285 and 286, and the solenoid valves 287 and 288 as described in the above-described second embodiment become unnecessary. Thus, the configuration is simplified.

Next, a part related to a liquid circulation system (liquid supply apparatus 200) in a fifth embodiment of the present disclosure is described below with reference to FIG. 16.

Figure 16:
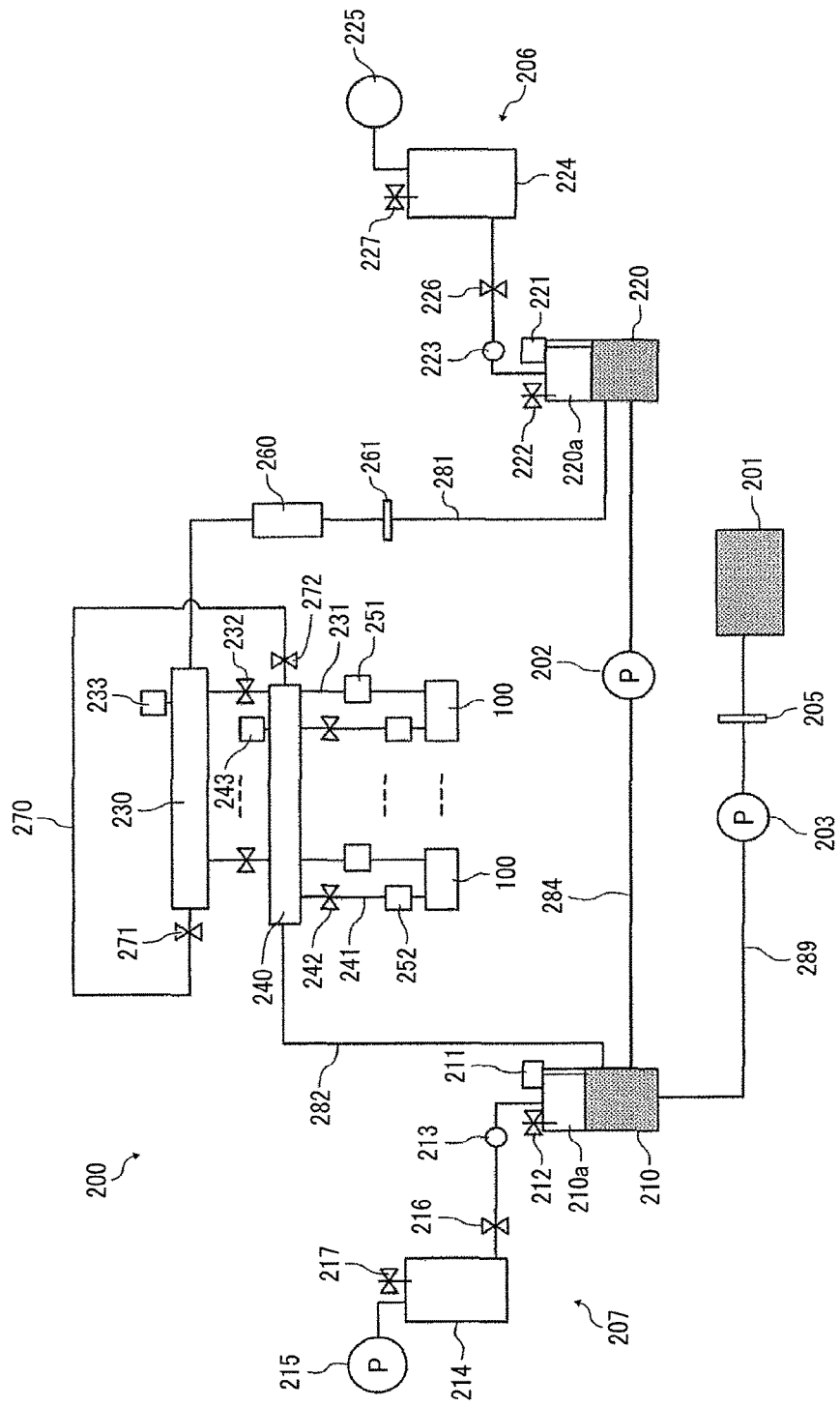
FIG. 16 is a schematic view of a liquid circulation system according to a fifth embodiment of the present disclosure.

FIG. 16 is a block diagram of the liquid circulation system. In the present fifth embodiment, the liquid is supplied from the second sub tank 210 to the first sub tank 220 by the first supply pump 202. Further, in the present fifth embodiment, the liquid is supplied from the main tank 201 to the second sub tank 210 by the second supply pump 203.

A second adjuster 207 is connected to the second sub tank 210 to adjust the pressure inside the second sub tank 210. The second adjuster 207 includes a pressure adjustment mechanism (regulator) 213, a decompression buffer tank 214, and a vacuum pump 215 as a gas pump. A solenoid valve 216 is provided between the regulator 213 and the decompression buffer tank 214. A solenoid valve 217 is provided on the decompression buffer tank 214.

A first adjuster 206 is connected to the first sub tank 220 to adjust the pressure inside the first sub tank 220. The first adjuster 206 includes a pressure adjustment mechanism (regulator) 223, a pressure buffer tank 224, and a compressor 225. A solenoid valve 226 is provided between the regulator 223 and the pressure buffer tank 224. A solenoid valve 227 is provided on the pressure buffer tank 224.

Thus, a part of configuration of the present embodiment in which the liquid circulates through the first sub tank 220, the heads 100 or the bypass channel 270, and the second sub tank 210 is similar to the first embodiment.

Figure 17:
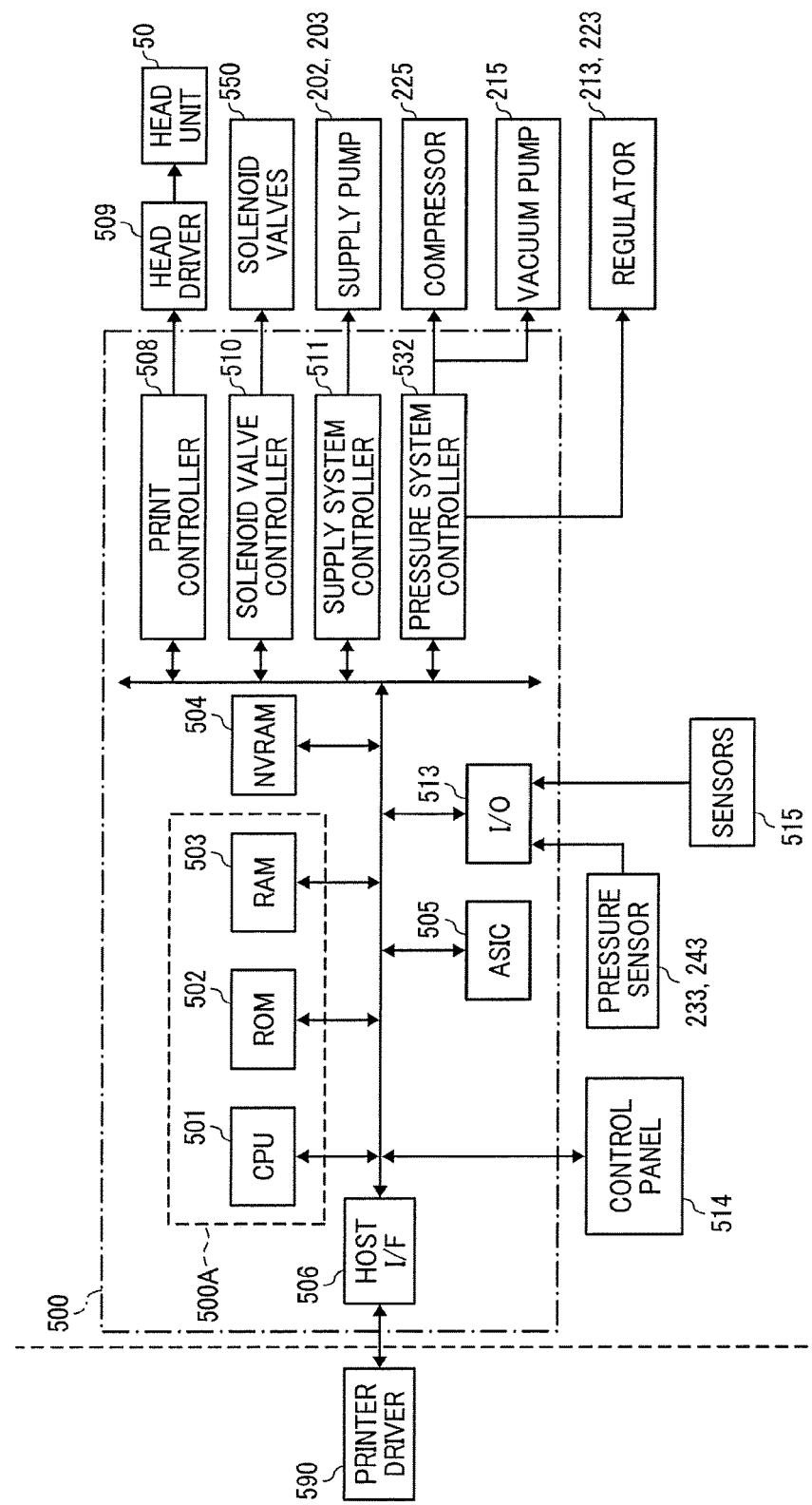
FIG. 17 is a block diagram of a controller of the liquid circulation system in the fifth embodiment.

Next, a circulation control of a controller (control circuitry) 500 in the present embodiment is described with reference to FIG. 17. FIG. 17 is a block diagram of the liquid circulation system.

The controller 500 includes a supply system controller 511 to control driving of the first supply pump 202 and the second supply pump 203. The controller 500 includes a pressure system controller 532 to control driving of the vacuum pump 215, the compressor 225, and the regulators 213 and 223. The other configuration is the same as those in the first embodiment.

The first degassing operation and the second degassing operation in the present embodiment may be realized by replacing the process of start driving of the first supply pump 202 and the second supply pump 203 in the first embodiment in FIGS. 8 and 9 with a process of start driving of the compressor 225 and the vacuum pump 215.

Next, a part related to a liquid circulation system (liquid supply apparatus 200) in a sixth embodiment of the present disclosure is described below with reference to FIG. 18.

Figure 18:
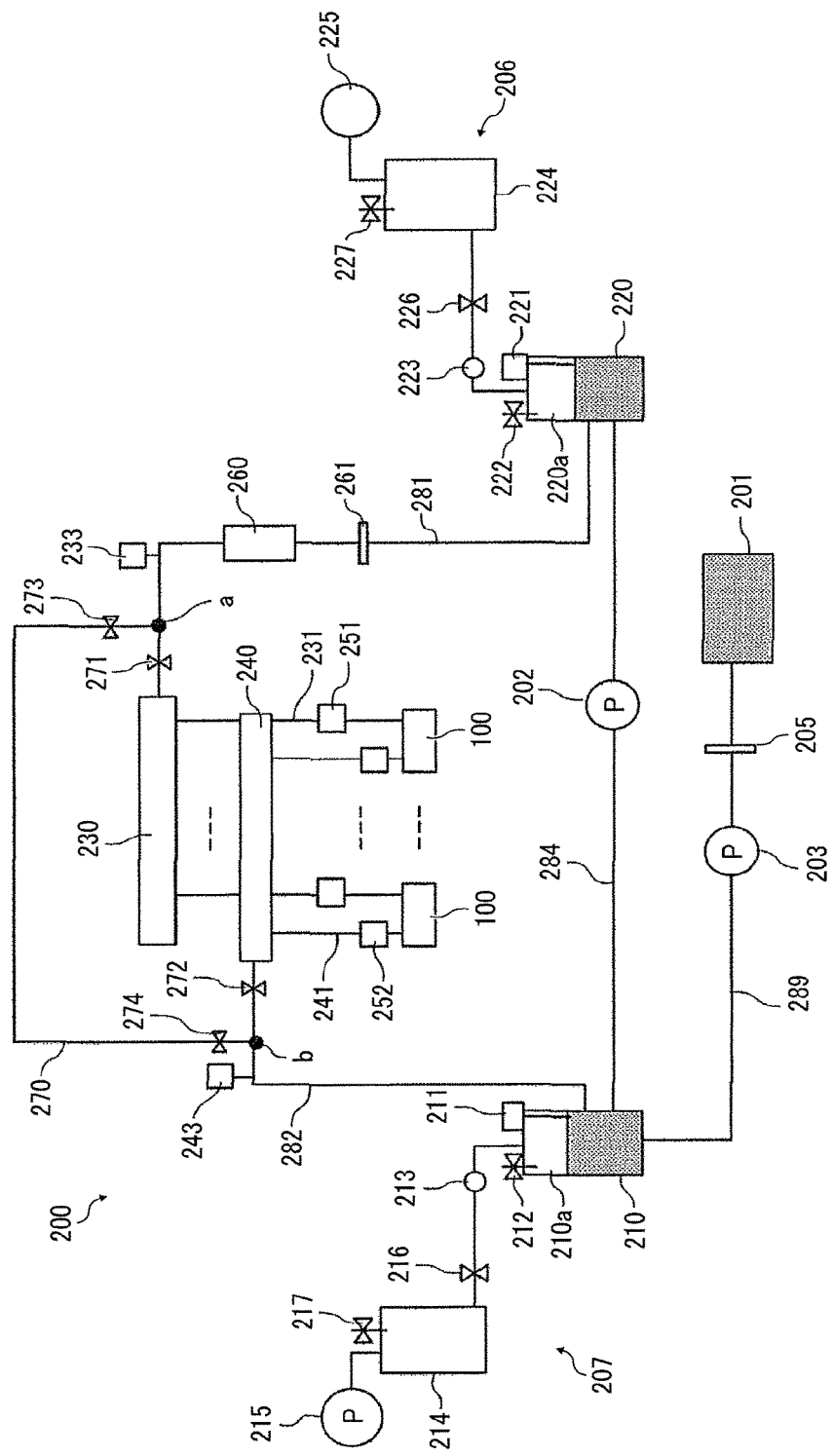
FIG. 18 is a schematic view of a liquid circulation system according to a sixth embodiment of the present disclosure.

FIG. 18 is a block diagram of the liquid circulation system. In the present embodiment, a connection point of the bypass channel 270 is similar to the connection point of the bypass channel 270 in the second embodiment in FIG. 11, and the other parts are similar to the fifth embodiment as illustrated in FIG. 16.

Therefore, the first degassing operation and the second degassing operation in the present embodiment may be realized by replacing the process of start driving of the first supply pump 202 and the second supply pump 203 in the second embodiment in FIGS. 12 and FIGS. 13A and 13B with a process of start driving of the compressor 225 and the vacuum pump 215.

A seventh embodiment according to the present disclosure is described with reference to FIG. 5 as described above. The details of the each part are the same as described above.

The degassing process of the liquid in the present embodiment is described blow. First, the controller 500 opens all of the solenoid valves 232, 242, 271, and 272. Then, the controller 500 circulates the liquid in the liquid supply apparatus 200 (liquid circulation system) using the first supply pump 202 and the second supply pump 203.

A flow path of the liquid at this time branches into two flow paths around the first manifold 230. The liquid flows toward the heads 100 in a first flow path. The liquid flows toward the bypass channel 270 in a second flow path. Here, a fluid resistance value of the heads 100 is greater than the fluid resistance value of the bypass channel 270. Thus, most of the liquid flows into the bypass channel 270. A small amount of the liquid in the vicinity of the heads 100 may circulate.

Most of the liquid staying in the vicinity of the heads 100 does not pass through the degassing device 260. Thus, the liquid in the vicinity of the head is not degassed by the degassing device 260. However, other liquid is degassed by the degassing device 260. The controller 500 closes the solenoid valves 271 and 272 after performing sufficient degassing operation. Thereby, the circulation channel of the liquid becomes the channel that path through the heads 100.

Then, the controller 500 circulates the liquid in the liquid supply apparatus 200 (liquid circulation system) using the first supply pump 202 and the second supply pump 203. At this time, if the liquid staying in the vicinity of the heads 100 that is not degassed and the liquid in the vicinity of the first manifold 230 that is degassed are rapidly mixed, the bubbles may be generated. Thus, it is preferable to control a circulation pressure at this time to be smaller than a previous circulation pressure when the liquid is circulated while opening all the solenoid valves.

In this way, the liquid can be efficiently circulated by opening all the solenoid valves 232, 242, 271, and 272. That is, when the bypass channel 270 is a part of the circulation channel, the heads 100 do not have to be removed from the circulation channel (the heads 100 may be a part of the circulation channel).

The present embodiment may be combined with each of other embodiments as described-above.

In the present disclosure, discharged liquid is not limited to a particular liquid as long as the liquid has a viscosity or surface tension to be discharged from a head. However, preferably, the viscosity of the liquid is not greater than 30 mPa·s under ordinary temperature and ordinary pressure or by heating or cooling.

Examples of the liquid include a solution, a suspension, or an emulsion including, for example, a solvent, such as water or an organic solvent, a colorant, such as dye or pigment, a functional material, such as a polymerizable compound, a resin, or a surfactant, a biocompatible material, such as DNA, amino acid, protein, or calcium, and an edible material, such as a natural colorant.

Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

"The liquid discharge head" includes an energy source for generating energy to discharge liquid. Examples of the energy source include a piezoelectric actuator (a laminated piezoelectric element or a thin-film piezoelectric element), a thermal actuator that employs a thermoelectric conversion element, such as a heating resistor (element), and an electrostatic actuator including a diaphragm and opposed electrodes.

In the present disclosure, "liquid discharge apparatus" refers to an apparatus including a liquid discharge head or a liquid discharge unit, configured to discharge a liquid by driving the liquid discharge head. The liquid discharge apparatus may be, for example, an apparatus capable of discharging liquid to a material to which liquid can adhere or an apparatus to discharge liquid toward gas or into liquid.

The liquid discharge apparatus may include devices to feed, convey, and eject the material on which liquid can adhere. The liquid discharge apparatus may further include a pretreatment apparatus to coat a treatment liquid onto the material, and a post-treatment apparatus to coat a treatment liquid onto the material, on which the liquid has been discharged.

The liquid discharge apparatus may be, for example, an image forming apparatus to form an image on a sheet by discharging ink, or a three-dimensional fabricating apparatus to discharge a fabrication liquid to a powder layer in which powder material is formed in layers, so as to form a three-dimensional fabrication object.

In addition, the liquid discharge apparatus is not limited to such an apparatus to form and visualize meaningful images, such as letters or figures, with discharged liquid. For example, the liquid discharge apparatus may be an apparatus to form meaningless images, such as meaningless patterns, or fabricate three-dimensional images.

The above-described term "material on which liquid can be adhered" represents a material on which liquid is at least temporarily adhered, a material on which liquid is adhered and fixed, or a material into which liquid is adhered to permeate. Examples of the "medium on which liquid can be adhered" include recording media, such as paper sheet, recording paper, recording sheet of paper, film, and cloth, electronic component, such as electronic substrate and piezoelectric element, and media, such as powder layer, organ model, and testing cell. The "medium on which liquid can be adhered" includes any medium on which liquid is adhered, unless particularly limited.

Examples of the material on which liquid can be adhered include any materials on which liquid can be adhered even temporarily, such as paper, thread, fiber, fabric, leather, metal, plastic, glass, wood, and ceramic.

"The liquid discharge apparatus" may be an apparatus to relatively move a liquid discharge head and a medium on which liquid can be adhered. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include a treatment liquid coating apparatus to discharge a treatment liquid to a sheet surface to coat the sheet surface with the treatment liquid to reform the sheet surface and an injection granulation apparatus to eject a composition liquid including a raw material dispersed in a solution from a nozzle to mold particles of the raw material.

The terms "image formation", "recording", "printing", "image printing", and "fabricating" used herein may be used synonymously with each other.

Numerous additional modifications and variations are possible in light of the above teachings. It is therefore to be understood that, within the scope of the above teachings, the present disclosure may be practiced otherwise than as specifically described herein. With some embodiments having thus been described, it is obvious that the same may be varied in many ways. Such variations are not to be regarded as a departure from the scope of the present disclosure and appended claims, and all such modifications are intended to be included within the scope of the present disclosure and appended claims.

What is claimed is:

1. A liquid discharge apparatus comprising:
   a circulation channel in which liquid circulates;
   a liquid discharge head disposed on the circulation channel to discharge the liquid;
   a bypass channel to connect an upstream portion and a downstream portion of the liquid discharge head;
   a switch to switch the circulation channel between a first route in which the bypass channel is a part of the circulation channel and a second route in which the bypass channel is not a part of the circulation channel;
   a pressure generator to generate pressure to circulate the liquid in the circulation channel;
   a degassing device to degas the liquid in the circulation channel; and
   control circuitry to:
   perform a first degassing operation and a second degassing operation performed after the first degassing operation, the first degassing operation circulating the liquid in the first route and the second degassing operation circulating the liquid in the second route; and start circulating the liquid in the second degassing operation with the pressure lower than the pressure in the first degassing operation.

2. The liquid discharge apparatus according to claim 1, wherein the control circuitry gradually or continuously increases the pressure in the second degassing operation.

3. The liquid discharge apparatus according to claim 1, wherein the control circuitry opens the second route after closing the first route and the second route when starting the second degassing operation.

4. The liquid discharge apparatus according to claim 1, further comprising:
a plurality of the liquid discharge heads;
a first manifold connected to each supply port of the plurality of liquid discharge heads; and
a second manifold connected to each discharge port of the plurality of liquid discharge heads,
wherein the bypass channel directly connects the first manifold and the second manifold.

5. The liquid discharge apparatus according to claim 1, further comprising:
a plurality of the liquid discharge heads;
a first manifold connected to each supply port of the plurality of liquid discharge heads; and
a second manifold connected to each discharge port of the plurality of liquid discharge heads,
wherein the bypass channel connects a first liquid channel disposed upstream of the first manifold and a second liquid channel disposed downstream of the second manifold.

6. The liquid discharge apparatus according to claim 5, further comprising:
a valve having a controllable opening degree to open and close the second liquid channel,
wherein the valve is disposed downstream of the second manifold and upstream of a connection point of the bypass channel and the second liquid channel.

7. The liquid discharge apparatus according to claim 5, further comprising:
a first valve to open and close the first liquid channel; and
a second valve to open and close the second liquid channel,
wherein:
the first valve is disposed upstream of the first manifold and downstream of a first connection point of the bypass channel and the first liquid channel;
the second valve is disposed downstream of the second manifold and upstream of a second connection point of the bypass channel and the second liquid channel; and
the control circuitry opens the second valve faster than an opening of the first valve when switching circulation from the first route to the second route.

8. The liquid discharge apparatus according to claim 1, wherein:

the bypass channel is a part of the circulation channel and the liquid discharge head is not a part of the circulation channel in the first route; and
the liquid discharge head is a part of the circulation channel and the bypass channel is not a part of the circulation channel in the second route.

9. A liquid discharge apparatus comprising:
a circulation channel in which liquid circulates;
a liquid discharge head disposed on the circulation channel to discharge the liquid;
a bypass channel to connect an upstream portion and a downstream portion of the liquid discharge head;
a switch to switch the circulation channel between a first route, in which the bypass channel is a part of the circulation channel and the liquid discharge head is not a part of the circulation channel, and a second route, in which the liquid discharge head is a part of the circulation channel and the bypass channel is not a part of the circulation channel;
a pressure generator to generate pressure to circulate the liquid in the circulation channel;
a degassing device to degas the liquid in the circulation channel; and
control circuitry to:
perform a first degassing operation and a second degassing operation performed after the first degassing operation, the first degassing operation circulating the liquid in the first route and the second degassing operation circulating the liquid in the second route; and
start circulating the liquid in the second degassing operation with the pressure lower than the pressure in the first degassing operation.

10. A method for degassing a liquid discharge apparatus that discharges liquid from a liquid discharge head, the method comprising:
circulating the liquid in a circulation channel on which the liquid discharge head is disposed;
connecting an upstream portion and a downstream portion of the liquid discharge head with a bypass channel;
degassing the liquid in the circulation channel while circulating the liquid by the circulating;
switching circulation between a first route, in which the bypass channel is a part of the circulation channel, and a second route, in which the bypass channel is not a part of the circulation channel;
performing a first degassing operation to circulate the liquid in the first route;
performing a second degassing operation after the first degassing operation, the second degassing operation circulating the liquid in the second route; and
starting circulating the liquid in the second degassing operation with the pressure lower than the pressure in the first degassing operation.

* * * * *